US 10,160,369 B2

(12) United States Patent
Friesen et al.

(10) Patent No.: US 10,160,369 B2
(45) Date of Patent: *Dec. 25, 2018

(54) TRAILER WITH AUTOMATED TRAILER RAMP

(71) Applicant: PJ Trailers, Inc., Sumner, TX (US)

(72) Inventors: Frank Friesen, Honey Grove, TX (US); Henry Froese, Summer, TX (US); Aaron Neil Barnes, Paris, TX (US)

(73) Assignee: PJ TRAILERS, INC., Sumner, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/673,130

(22) Filed: Aug. 9, 2017

(65) Prior Publication Data

US 2017/0334331 A1 Nov. 23, 2017

Related U.S. Application Data

(63) Continuation of application No. 14/210,695, filed on Mar. 14, 2014, now Pat. No. 9,764,674.

(60) Provisional application No. 61/788,734, filed on Mar. 15, 2013.

(51) Int. Cl.
*B60P 1/43* (2006.01)
(52) U.S. Cl.
CPC .................................. *B60P 1/438* (2013.01)
(58) Field of Classification Search
CPC .................................. B60P 1/438; B60P 1/43
See application file for complete search history.

(56) References Cited

U.S. PATENT DOCUMENTS

| | | | |
|---|---|---|---|
| 4,274,172 A | 6/1981 | Franklin |
| 4,305,694 A | 12/1981 | Chan |
| 4,372,727 A | 2/1983 | Fredrickson et al. |
| 4,836,736 A | 6/1989 | Neagu |
| 5,145,310 A | 9/1992 | Calzone |
| 5,391,041 A | 2/1995 | Stanbury et al. |
| 5,393,192 A | 2/1995 | Hall et al. |
| 5,644,992 A | 7/1997 | Clive-Smith |
| 5,678,984 A | 10/1997 | Petersen |
| 6,186,734 B1 | 2/2001 | Maurer |
| 6,860,702 B1 | 3/2005 | Banks |

(Continued)

FOREIGN PATENT DOCUMENTS

| | | |
|---|---|---|
| CA | 2538138 A1 | 3/2006 |
| CA | 2906791 C | 5/2018 |
| DE | 2745837 A1 | 4/1979 |

OTHER PUBLICATIONS

Copending U.S. Appl. No. 14/210,695, filed Mar. 14, 2014; first-named inventor: Frank Friesen, entitled: Trailer with Automated Trailer Ramp.

(Continued)

*Primary Examiner* — Jonathan Snelting
(74) *Attorney, Agent, or Firm* — Foley & Lardner LLP

(57) ABSTRACT

A trailer having a trailer ramp system that includes a trailer ramp coupled with the trailer and an actuator pivotally coupled to the trailer on a first end of the actuator and pivotally coupled to the trailer ramp on a second end of the actuator. The actuator is located below the trailer and is aligned with a central axis of the trailer ramp and a central axis of the trailer. The actuator is movable linearly to rotate the trailer ramp between an open position and a closed position.

20 Claims, 20 Drawing Sheets

(56) References Cited

U.S. PATENT DOCUMENTS

| | | |
|---|---|---|
| 7,503,742 B2 | 3/2009 | Smith, Jr. |
| 7,527,467 B2 | 5/2009 | Edwards et al. |
| 8,267,466 B1 | 9/2012 | Smith, Jr. et al. |
| 8,327,486 B2 | 12/2012 | Fontaine et al. |
| 8,375,496 B1 | 2/2013 | Johnson et al. |
| 9,764,674 B2 | 9/2017 | Friesen et al. |
| 2002/0081185 A1 | 6/2002 | Hedtke |
| 2006/0099061 A1 | 5/2006 | Smith et al. |
| 2008/0178400 A1 | 7/2008 | Brown |
| 2014/0271072 A1 | 9/2014 | Friesen et al. |

OTHER PUBLICATIONS

Copending International Patent Application No. PCT/US2014/27342, filed Mar. 14, 2014; first-named inventor: Frank Friesen, entitled: Trailer with Automated Trailer Ramp.

PJ Trailers, Hydraulic Dovetail, website article printed Jun. 3, 2013 from http://www.pjtrailers.com/options/hudraulic-dovetail/.

International Search Report and Written Opinion in International Patent Application No. PCT/US2014/027342, dated Jul. 28, 2014.

International Preliminary Report on Patentability in International Patent Application No. PCT/US2014/027342, dated Sep. 15, 2015.

U.S. Appl. No. 14/210,695, Restriction Election dated Oct. 02, 2015, 7 pgs.

U.S. Appl. No. 14/210,695, Non-Final Office Action dated Jan. 7, 2016, 12 pgs.

U.S. Appl. No. 14/210,695, Final Office Action dated Dec. 12, 2016, 9 pgs.

U.S. Appl. No. 14/210,695, Non-Final Office Action dated Apr. 27, 2017, 10 pgs.

U.S. Appl. No. 14/210,695, Notice of Allowance dated Jun. 23, 2017, 12 pgs.

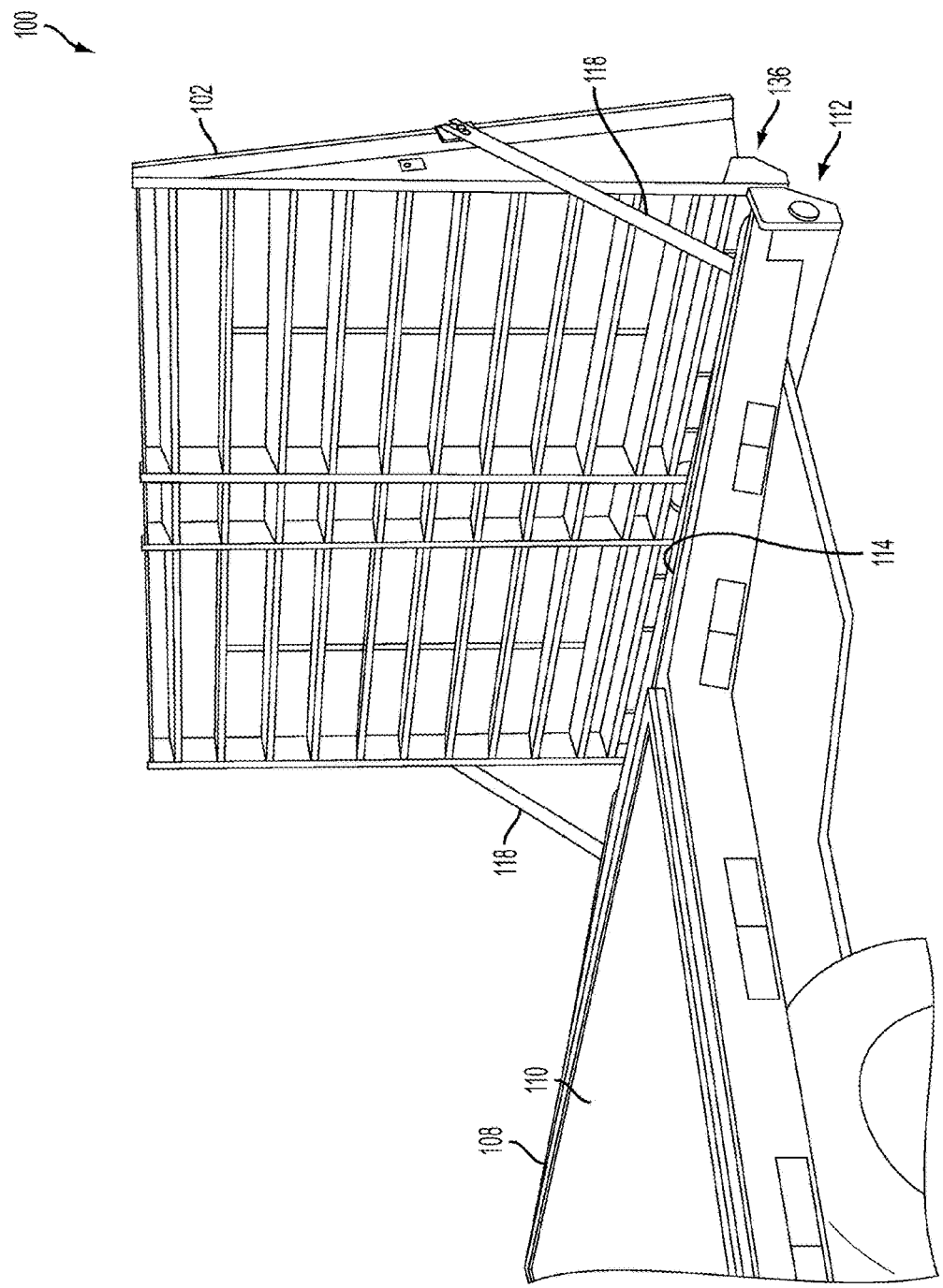

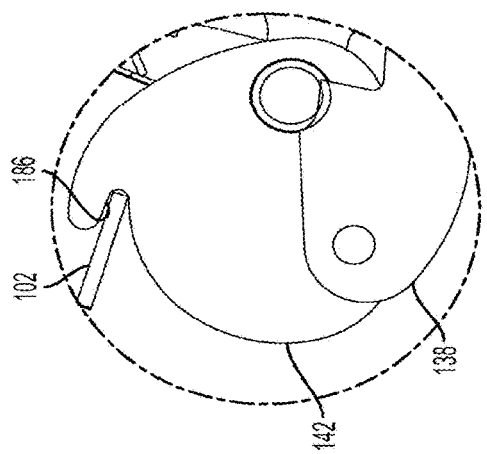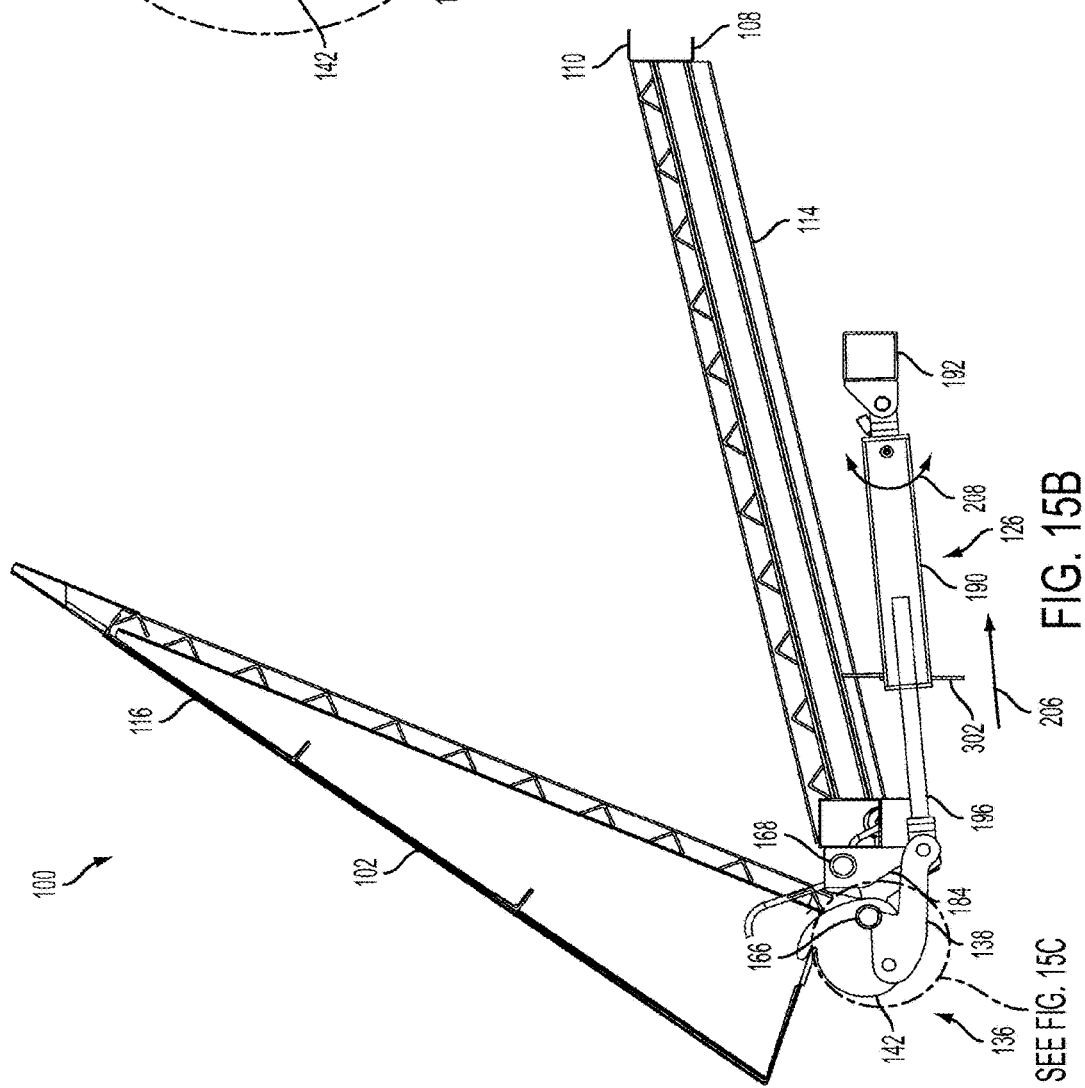

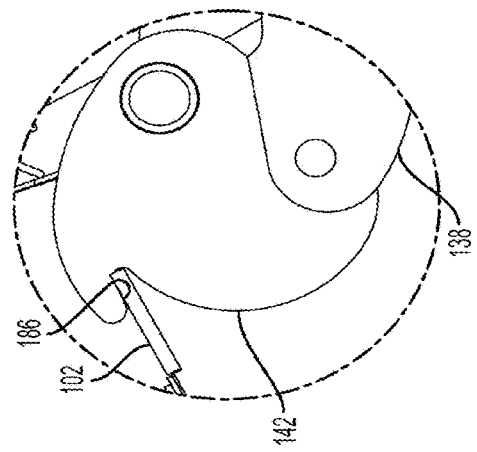
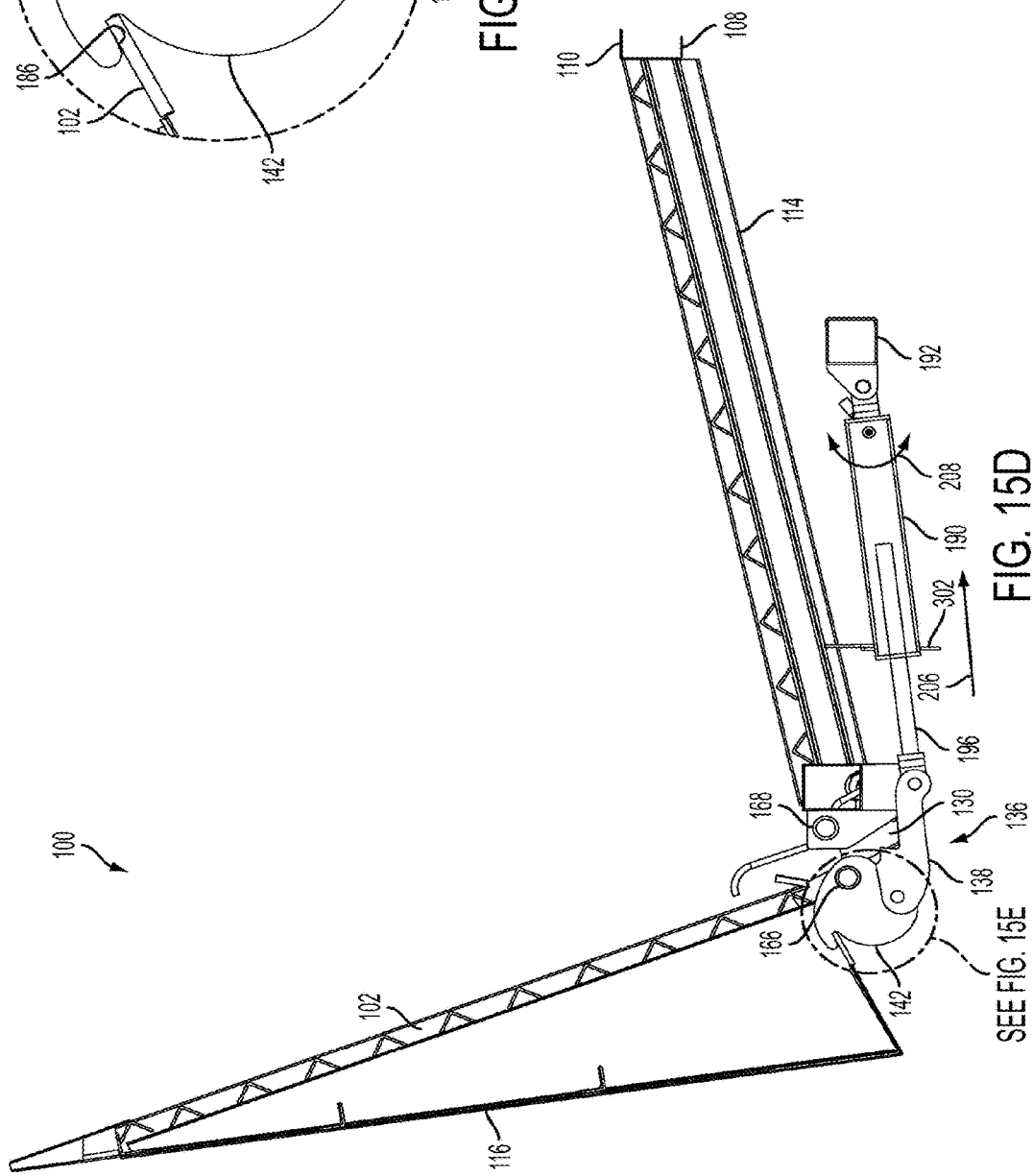

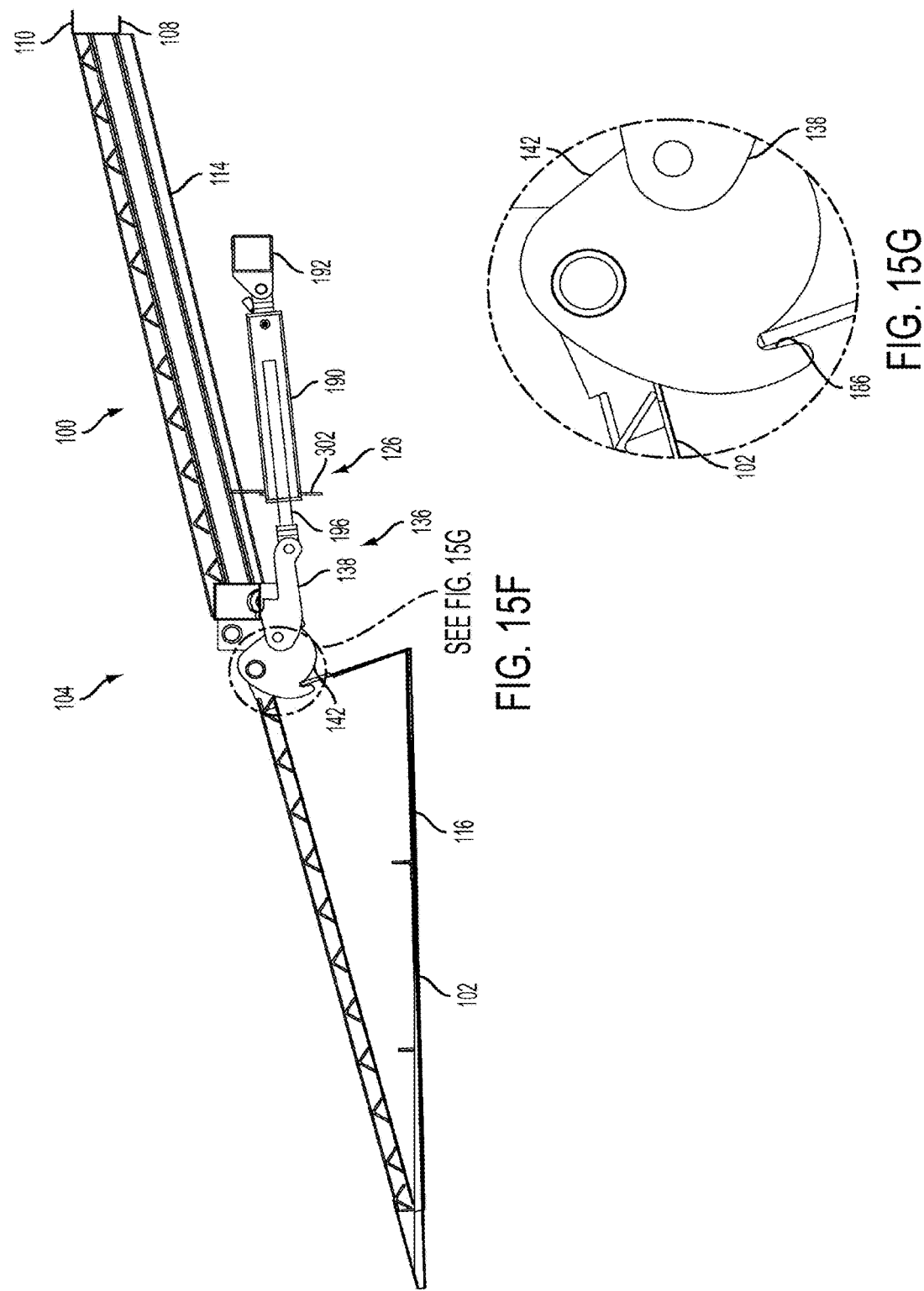

TRAILER WITH AUTOMATED TRAILER RAMP

CROSS-REFERENCE TO RELATED APPLICATION

The present application is a continuation of and claims priority to U.S. Non-Provisional patent application Ser. No. 14/210,695, filed Mar. 14, 2014, and entitled "Trailer with Automated Trailer Ramp," which claims priority to U.S. Provisional Application for Patent No. 61/788,734, filed Mar. 15, 2013, and entitled "Trailer with Automated Trailer Ramp," both of which are hereby incorporated by reference.

TECHNICAL FIELD

This disclosure relates to trailers, and more particularly to trailers with automated ramps and mechanisms for deploying the trailer ramp.

BACKGROUND OF THE DISCLOSURE

Trailers are often connected to a vehicle in order to haul large items. Oftentimes, it is desirable to load the items onto the trailer without lifting the items directly onto a top surface of the trailer. For example, construction equipment, all-terrain vehicles, automobiles and other wheeled items are often more easily loaded onto a trailer by rolling the item onto the trailer rather than lifting the item directly onto the top surface of the trailer. Mechanisms have been developed to allow for loading of items onto a trailer without lifting the item directly onto the top surface of the trailer, such as, for example, ramps that are connected to an end of a trailer. In addition, some modified trailers have been provided with a slanted end of the trailer, often called a "dovetail," so that the end of the trailer is closer to ground level.

While these mechanisms have been developed to make loading more convenient, current mechanisms suffer from many shortcomings. For example, current ramps are often very heavy and, as a result, it is often difficult or impossible for a single user to move the ramp between the open and closed positions. As such, multiple users, or in some cases, heavy-duty forklifts or other construction equipment are often necessary to utilize the ramp. Even if a particular ramp can be moved by a single user, it is often dangerous to do so without the assistance of another person. Additionally, weather conditions and other environmental factors can make manual operation of current ramps difficult and cumbersome.

SUMMARY

In a first aspect, there is provided a trailer having a trailer ramp system that includes a trailer ramp coupled with the trailer and an actuator pivotally coupled to the trailer on a first end of the actuator and pivotally coupled to the trailer ramp on a second end of the actuator. The actuator is located below the trailer and is aligned with a central axis of the trailer ramp and a central axis of the trailer. The actuator is movable linearly to move the trailer ramp between an open and a closed position.

In certain embodiments, a connection between the trailer ramp and the trailer includes a connector that links a first hinge member coupled to the trailer ramp to a second hinge member coupled to the trailer. The first hinge member is maintained at a distance from the second hinge member by the connector.

In other embodiments, the connector includes a contact arm for contacting a fixed surface on the trailer and a first biasing mechanism for applying a biasing force to the trailer ramp when the contact arm contacts the fixed surface.

In another embodiment, the first biasing mechanism biases the trailer ramp toward the closed position.

In yet another embodiment, the system includes a second biasing mechanism for biasing the trailer ramp toward the open position. The first biasing mechanism is engaged when the trailer ramp is moving toward the open position and the second biasing mechanism is engaged when the ramp is moving toward the closed position.

In some embodiments, a connection between the actuator and the trailer ramp includes a cam that connects the first hinge member to the trailer ramp.

In other embodiments, the connection between the actuator and the trailer ramp further includes a linking arm that is pivotally connected to the cam and pivotally connected to the actuator.

In certain embodiments, the actuator is a linear actuator that includes one or more of a hydraulic piston, an electronic actuator, a step motor, an electronic winch, a hydraulic winch, a manual winch, an air bag, a pneumatic actuator, an air cylinder, a linear actuator, a mechanical jack, a hydraulic jack and a hydraulic pump.

In other embodiments, a top surface of the trailer ramp rotates at least about 180 degrees between the open position and the closed position.

In another embodiment, the actuator is controllable to hold the trailer ramp in a position between the open position and the closed position.

In yet another embodiment, the actuator is movable within a slot in a bottom surface of the trailer.

In still another embodiment, the actuator pivots up to about 2 degrees about a pivotal coupling between the actuator and the trailer.

In some embodiments, the system includes a coupling mechanism that is coupled to the trailer ramp and includes an opening that holds at least part of the actuator and restrains some pivotal movement of the actuator.

In a second aspect, there is described a trailer including a trailer ramp system. The system includes a trailer, a wedge-shaped trailer ramp and an actuator. The trailer includes a dovetail portion and the trailer ramp is pivotally connected to the trailer adjacent the dovetail portion. The actuator is coupled to the wedge-shaped trailer ramp and the trailer to allow pivoting of the wedge-shaped trailer ramp with respect to the dovetail section of the trailer between a closed position and an open position. A bottom surface of the wedge-shaped trailer ramp is aligned with a top surface of the trailer when the wedge-shaped trailer ramp is in the closed position. The actuator is coupled to the ramp by a linking arm and a cam.

In certain embodiments, a pivotal connection between the trailer and the trailer ramp includes a connector that links a first hinge member coupled to the trailer ramp to a second hinge member coupled to the trailer. The first hinge member is maintained at a distance from the second hinge member by the connector.

In other embodiments, the linking arm is coupled to the actuator and the cam. The cam is also coupled to the first hinge member and the trailer ramp.

In another embodiment, the system includes a coupling mechanism encircling at least part of the actuator. The coupling mechanism is coupled to a bottom surface of the trailer ramp and restrains some pivotal movement of the actuator.

In a third aspect, there is provided a method of moving a trailer ramp from a closed position to an open position. The method includes retracting a portion of an actuator that is coupled to a linking arm. The linking arm is pivotally coupled to a cam. The cam is rotated about a first hinge member and the cam is coupled to the first hinge member and the ramp. The first hinge member is moved with respect to a second hinge member that is coupled to a trailer. The ramp is pivoted to an open position.

In certain embodiments, the method includes applying a biasing force to the trailer ramp as the trailer ramp moves from the closed position to the open position.

In other embodiments, the method includes maintaining a predetermined distance between the first hinge member and the second hinge member as the trailer ramp moves from the closed position to the open position.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE FIGURES

The accompanying drawings facilitate an understanding of the various embodiments.

FIG. 3 is a perspective view of a trailer, a trailer ramp in a position between the open and the closed positions and an apparatus for pivoting the trailer ramp.

FIG. 15B is a side view of a trailer, a trailer ramp in a partially open position and an apparatus for pivoting the trailer ramp.

FIG. 15C is a magnified side view of the cam of FIG. 15B.

FIG. 15D is a side view of a trailer, a trailer ramp in a partially open position and an apparatus for pivoting the trailer ramp.

FIG. 15E is a magnified side view of the cam of FIG. 15D.

FIG. 15F is a side view of the trailer, a trailer ramp in the open position and an apparatus for pivoting the trailer ramp.

FIG. 15G is a magnified side view of the cam of FIG. 15F.

DETAILED DESCRIPTION

Figure 1:
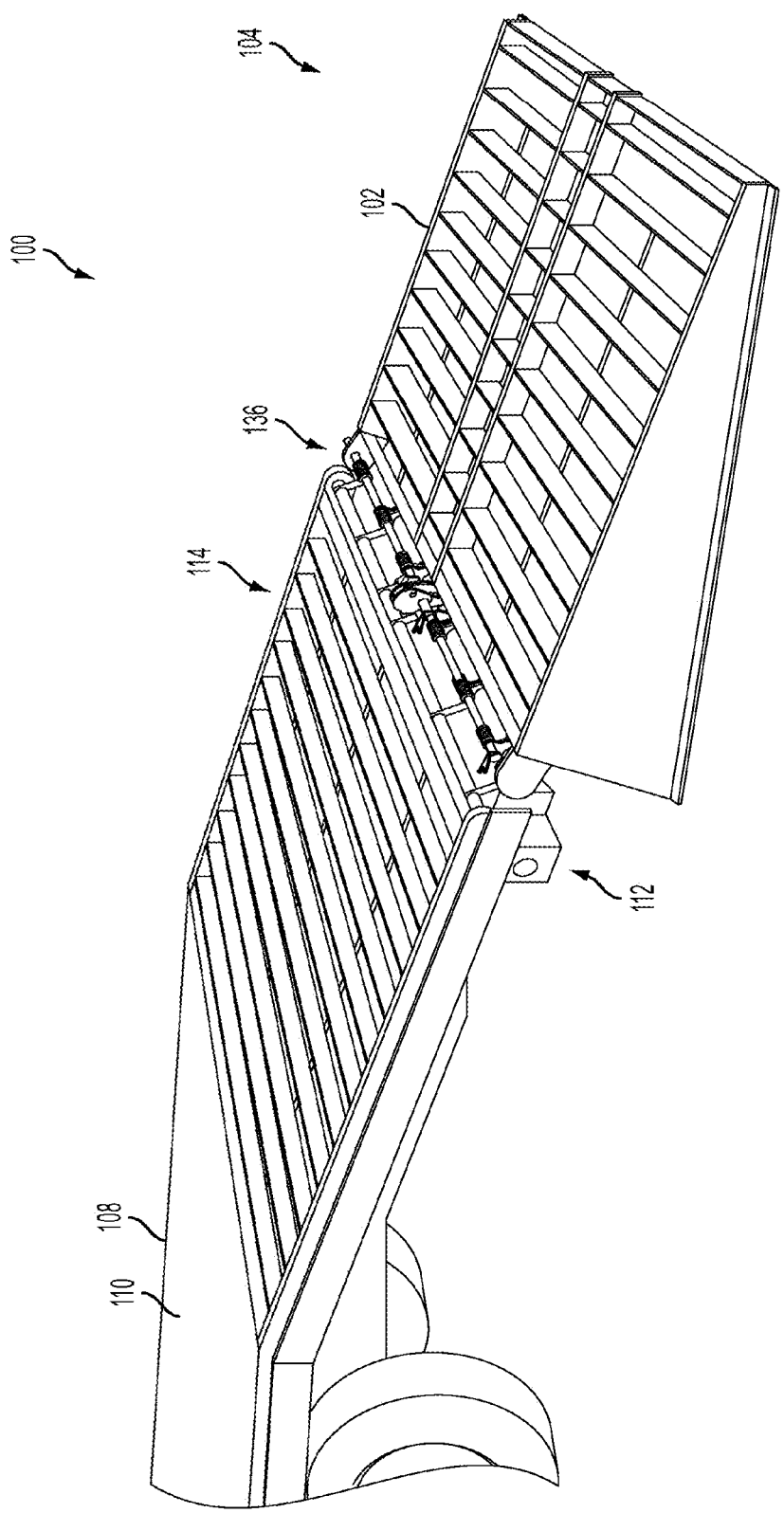
FIG. 1 is a perspective view of a trailer, a trailer ramp in the open position and an apparatus for pivoting the trailer ramp.
Figure 2:
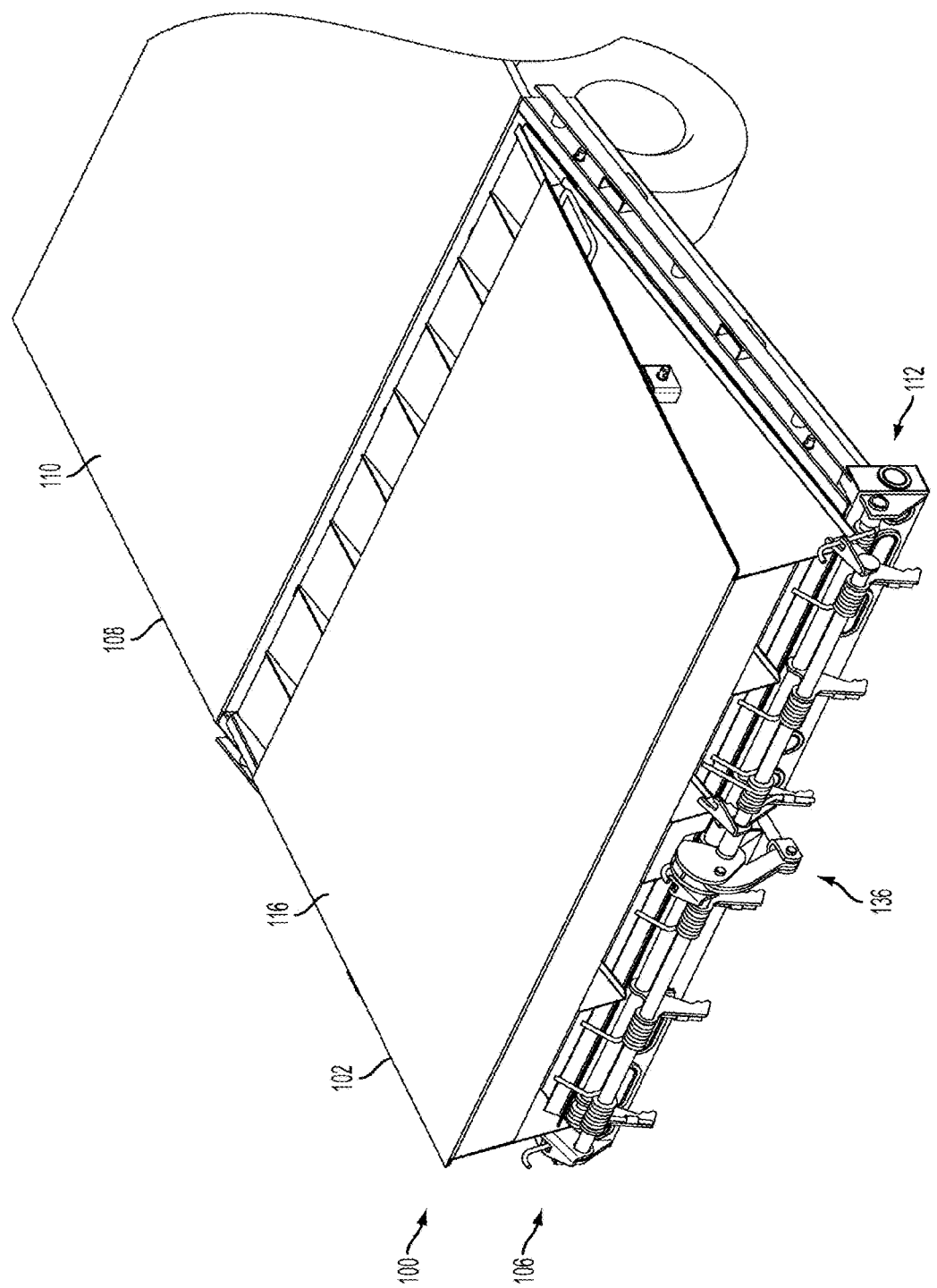
FIG. 2 is a perspective view of a trailer, a trailer ramp in the closed position and an apparatus for pivoting the trailer ramp.

FIG. 1 is a perspective view of a trailer 108, a trailer ramp 102 in an open position 104 and an apparatus 136 for pivoting the trailer ramp 102 between an open position 104 and a closed position 106 (FIG. 2). In some embodiments, the trailer ramp system 100 is operable by a single user to more easily move the ramp 102 between an open position 104 and a closed position 106. As will be described in more detail below, the trailer ramp system 100 allows for automated pivoting of the ramp 102 between the open 104 and the closed position 106 without the need for manually lifting the ramp 102.

In general, the trailer ramp system 100 includes a trailer ramp 102 and an apparatus 136 for pivoting the trailer ramp between the open position 104 and the closed position 106 (FIG. 2). The trailer ramp system 100 is connectable to a trailer 108 that may be attached to a vehicle (not shown), such as a truck or tractor. For purposes of illustration, a dovetail trailer 108 and a wedge-shaped trailer ramp 102 are shown in the FIG. 1, but the trailer ramp system 100 may include any type of trailer 108, such as, for example, a flatbed trailer or a straight deck trailer, and the trailer ramp system 100 may include any type of trailer ramp, such as, for example, a flat trailer ramp, a trailer ramp that includes a cutaway edge 808 (FIG. 11), or a trailer ramp 102 that includes a knife edge 810 (FIG. 15). The trailer ramp system 100 is configured to move the trailer ramp 102 between an open position 104 in which the trailer ramp 102 is extended, as shown in FIG. 1, and a closed position 106 in which the trailer ramp 102 is stored on the trailer 108, as shown in FIG. 2.

FIG. 2 is a perspective view of a trailer 108, a trailer ramp 102 in the closed position 106 and an apparatus 136 for pivoting the trailer ramp 102. In some embodiments, a bottom surface 116 of the trailer ramp 102 is aligned with a top surface 110 of the trailer 108 when the trailer ramp 102 is in the closed position 106, as in the case of a dovetail trailer 108 with a wedge-shaped trailer ramp 102. However, in some embodiments, the bottom surface 116 of the trailer ramp 102 may extend above or below the top surface 110 of the trailer 108, such as, for example, in the case of a wedge-shaped trailer ramp 102 used with a flatbed trailer 108.

FIG. 3 is a perspective view of a trailer 108, a trailer ramp 102 in a position between the open 104 and the closed 106 positions and an apparatus 136 for pivoting the trailer ramp 102. The trailer ramp system 100 is configured to facilitate fixing the position of the trailer ramp 102 between the open position 104 and the closed position 106. Fixing the position of the trailer ramp 102 between the open position 104 and the closed position 106 may, for example, allow the trailer ramp 102 to act as a gate for the end 112 of the trailer 108 and may provide more room on the trailer 108 to store items on a top surface 110 of the trailer 108. Linking elements 118 may be used to secure the ramp 102 between the closed position 106 and the open position 104.

Figure 3A:
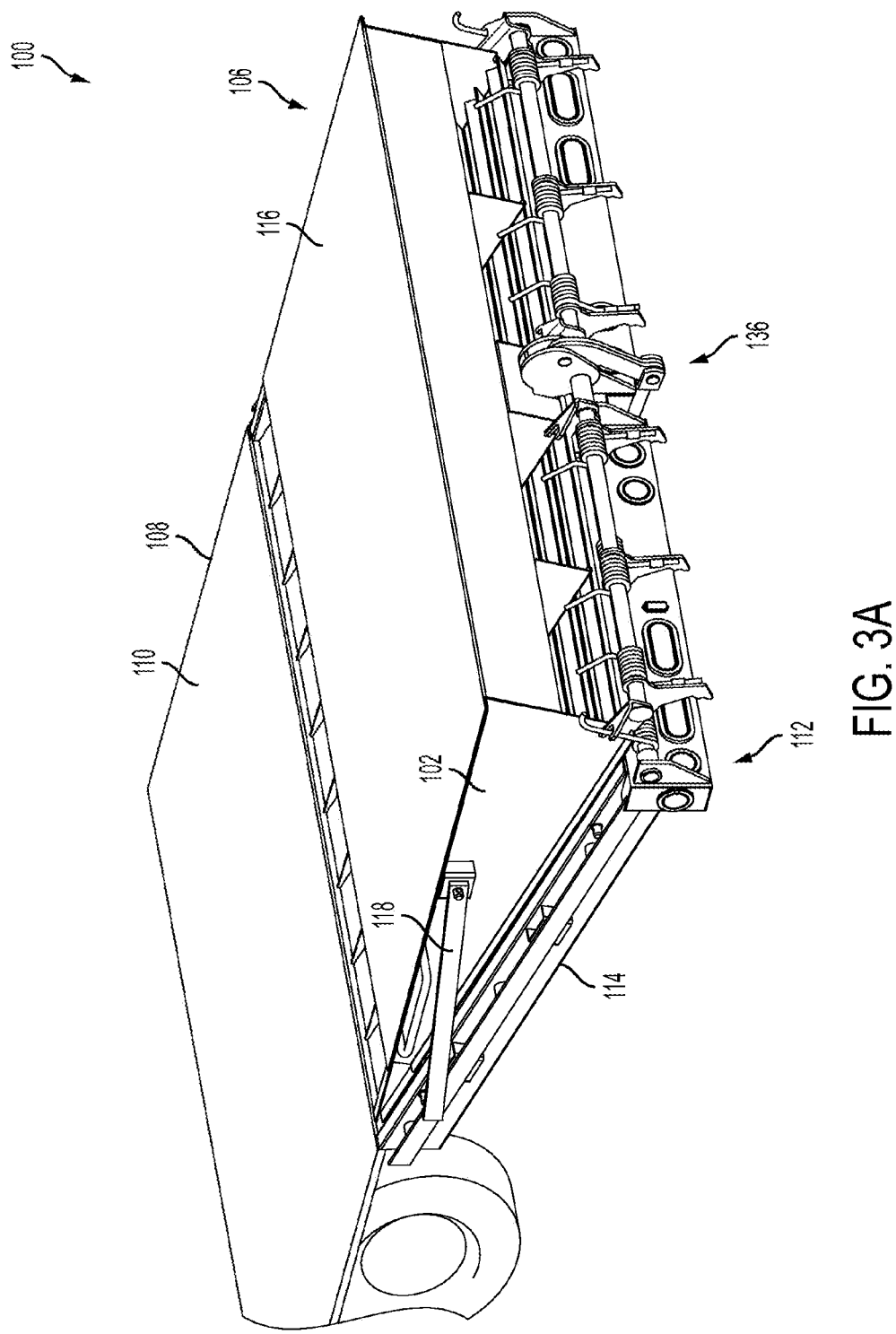
FIG. 3A is a perspective view of a trailer, a trailer ramp in the closed position and an apparatus for pivoting the trailer ramp.

FIG. 3A is a perspective view of a trailer 108, a trailer ramp 102 in the closed position and an apparatus 136 for pivoting the trailer ramp 102. In some embodiments, the trailer ramp system 100 includes linking elements 118 to secure the trailer ramp 102 to the trailer 108 when the trailer ramp 102 is in the closed position 106.

Figure 4:
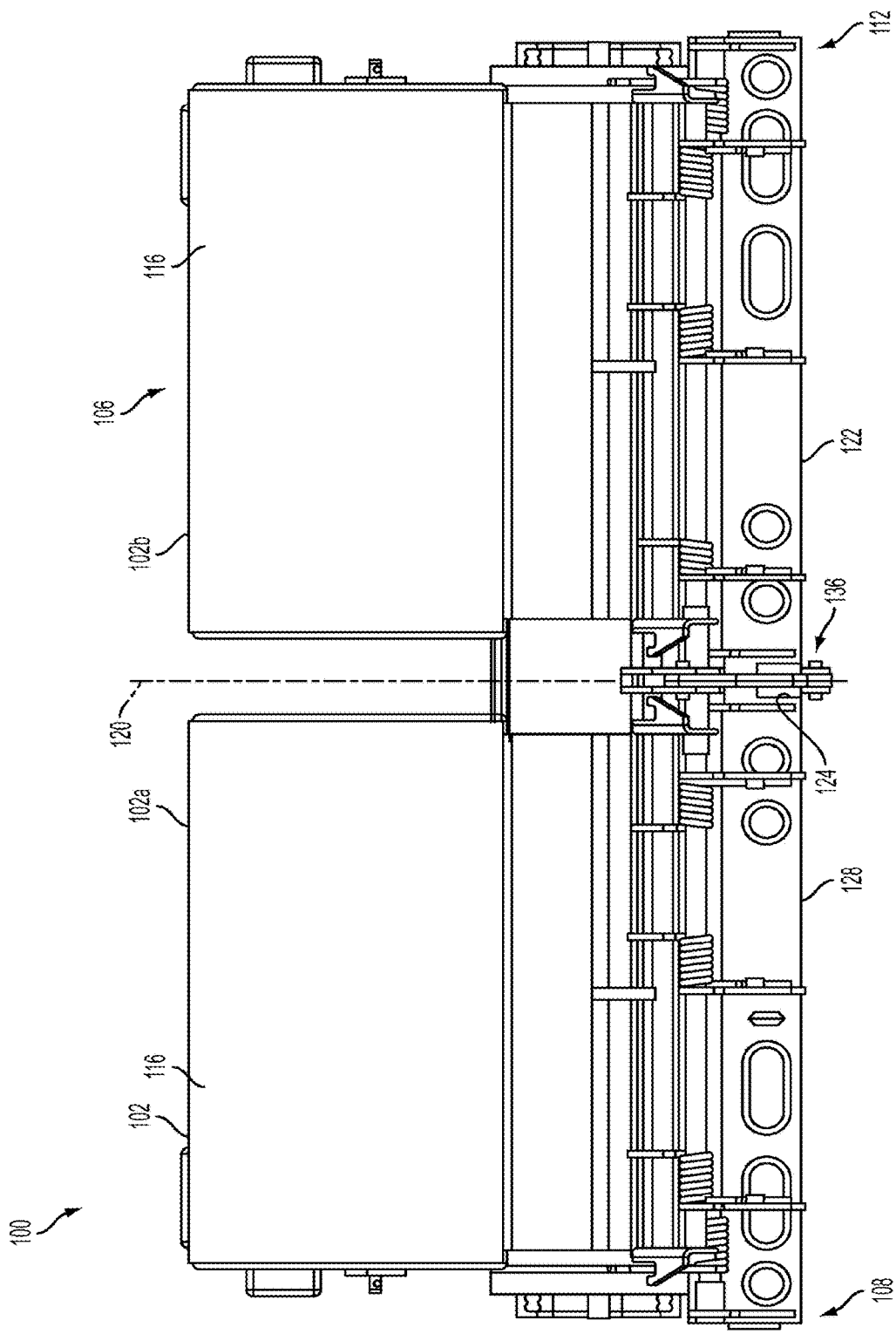
FIG. 4 is a front view of a trailer, a trailer ramp and an apparatus for pivoting the trailer ramp.

FIG. 4 is a front view of a trailer 108, a trailer ramp 102 and an apparatus 136 for pivoting the trailer ramp 102. In some embodiments, an apparatus 136 to move the trailer ramp 102 is pivotally connected to the trailer 108 and to the trailer ramp 102 to move the trailer ramp 102 between the open position 104 and the closed position 106. The apparatus 136 may be located along a central axis 120 of the trailer 108 and trailer ramp 102 when the trailer ramp 102 is in the closed position 106. For example, in some embodiments, the apparatus 136 includes an actuator 126 (FIG. 6) that is located along a central axis 120 of the trailer 108 and the trailer ramp 102. The actuator 126 and other components of the apparatus 136 may be movable within a notch 124 in a bumper 122 of the trailer 108 so that the actuator 126 and other components of the apparatus 136 are adjacent to a bottom surface 128 of the trailer 108. The trailer ramp 102 may include a first trailer ramp portion 102a that is fixed to a second trailer ramp portion 102b. In other embodiments, the trailer ramp 102 is a single continuous trailer ramp. In other embodiments, the trailer ramp 102 may be any type of trailer ramp and may include any number of separate trailer ramp portions. In some embodiments, the trailer ramp system 100 may include more than one apparatus 136 to move the trailer ramp 102.

Figure 5:
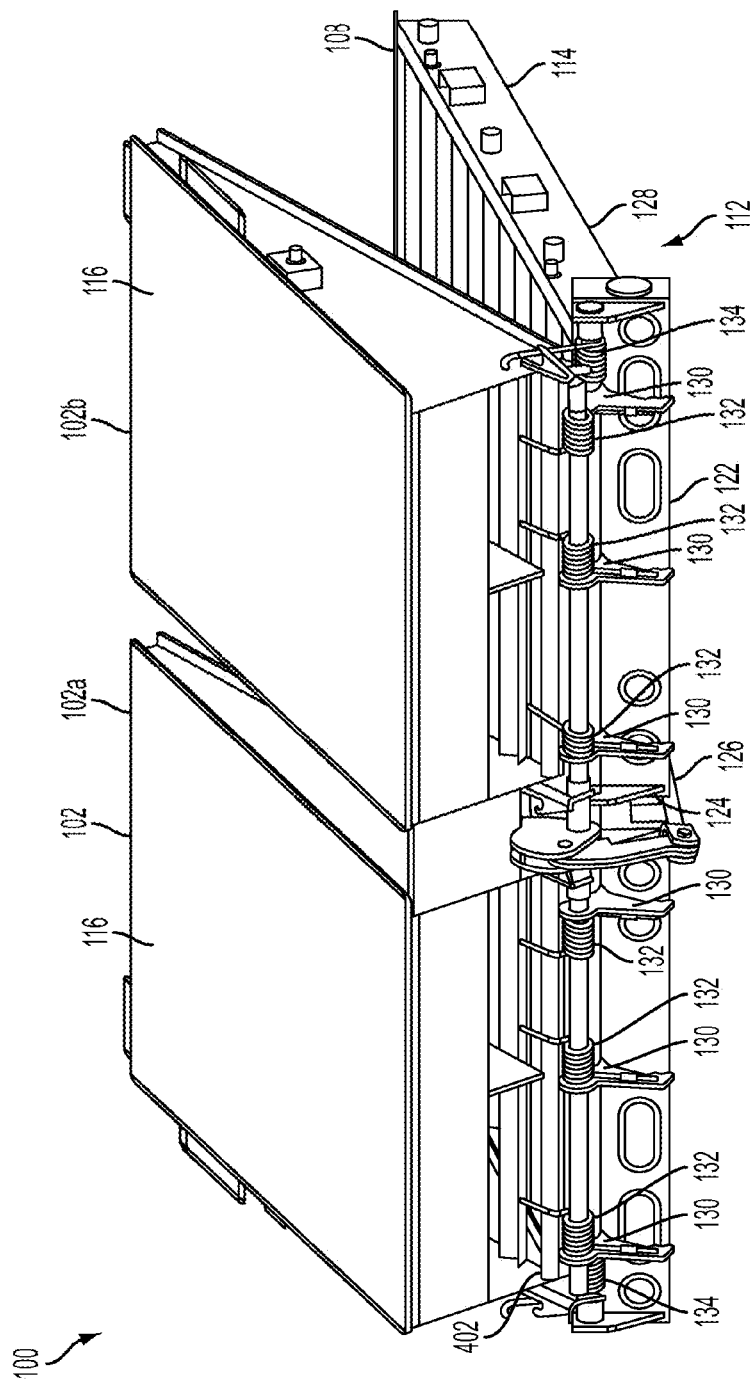
FIG. 5 is a perspective view of a trailer, a trailer ramp in a position between the open and the closed positions, and an apparatus for pivoting the trailer ramp.

FIG. 5 is a perspective view of a trailer 108, a trailer ramp 102 in a position between the open 104 and the closed 106 positions and an apparatus 136 for pivoting the trailer ramp 102. As described above, the apparatus 136 may move within the notch 124 in the bumper 122. In some embodiments, the system 100 includes a protective plate or covering (not shown) to protect the actuator 126 and other elements of the apparatus 136 from impact with objects under the trailer 108.

Figure 6:
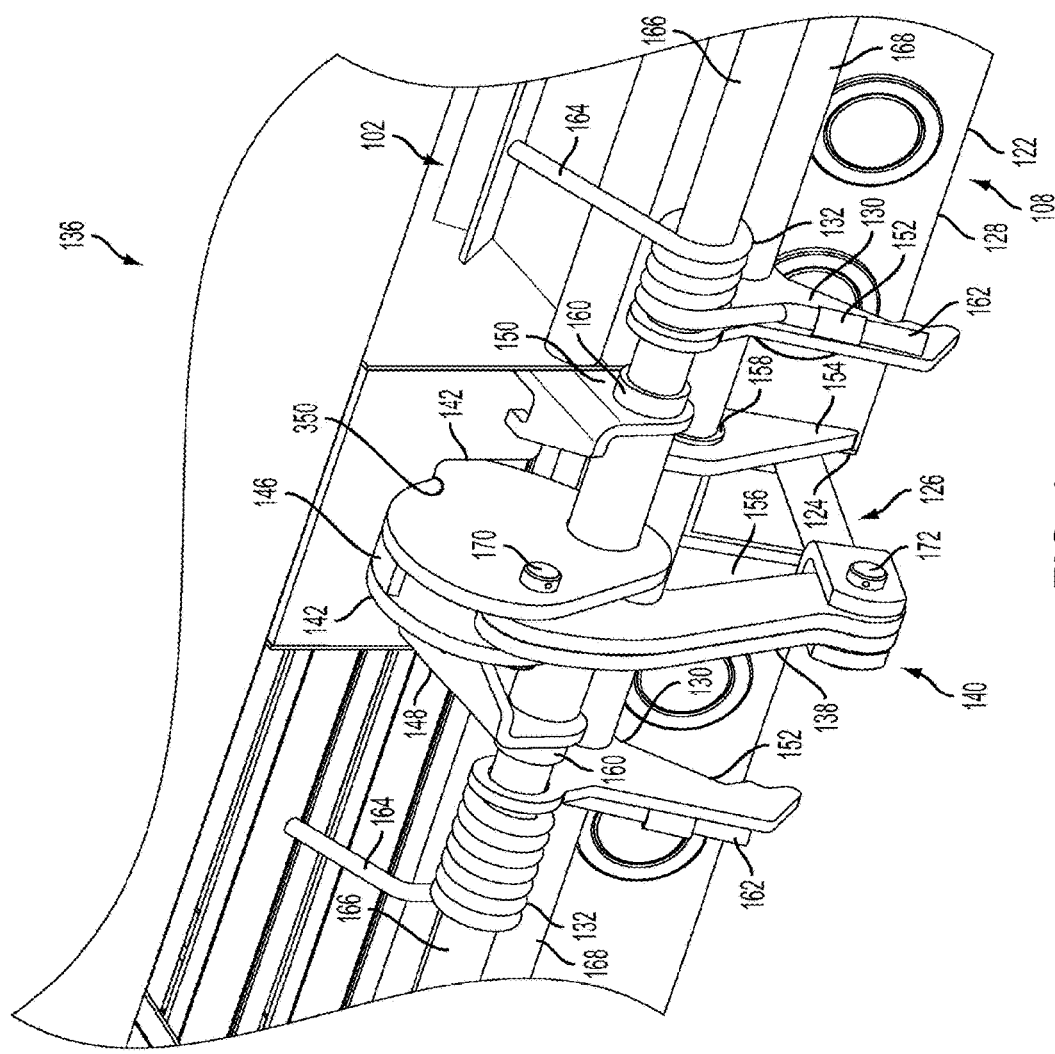
FIG. 6 is a magnified view of a portion of an apparatus for pivoting the trailer ramp.
Figure 13:
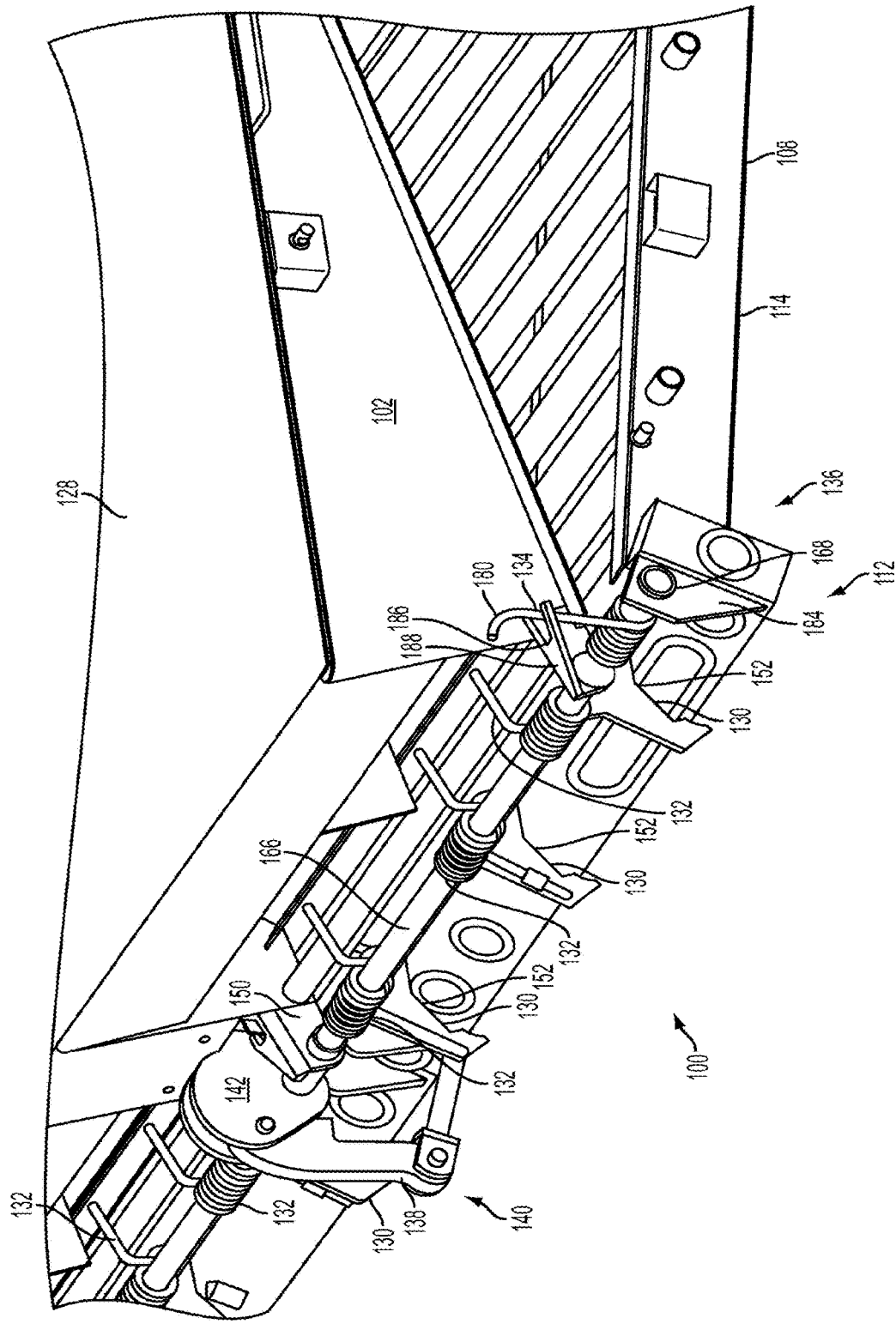
FIG. 13 is a perspective view of a trailer, a trailer ramp in a location between the open and the closed positions and an apparatus for pivoting the trailer ramp.

FIG. 6 is a magnified view of a portion of the apparatus 136 for pivoting the trailer ramp 102. The apparatus 136 includes a first hinge member 166, a second hinge member 168, one or more connectors 130 linking the first hinge member 166 to the second hinge member 168, one or more cams 142, a linking arm 138 and an actuator 126. The first hinge member 166 and the second hinge member 168 may be elongated bars and may be made of a material such as metal. The first hinge member 166 is connected to the trailer ramp 102 by a first linking support 148, a second linking support 150 and a sleeve 160 that encircles the first hinge member 166. The sleeve 160 may be secured to the first hinge member 166 by, for example, a bolt or welded connection (not shown). In some embodiments, the sleeve 160 is movably coupled to the first hinge member 166 so that the first hinge member 166 can rotate within the sleeve 160. The first hinge member 166 may also be connected to the trailer ramp 102 by additional linking supports 188 (FIG. 13). Any number of linking supports 148 and 150 or additional linking supports 188 may be used to secure the first hinge member 166 to the trailer ramp 102. In some embodiments, the first hinge member 166 is integral with and forms part of the trailer ramp 102.

The second hinge member 168 is connected to the trailer 108 by a first protrusion 154 and a second protrusion 156 that are secured to a portion of the trailer 108, such as, for example, the bumper 122 of the trailer 108. The first protrusion 154 and the second protrusion 156 each include an aperture 158 (only one aperture 158 is shown in FIG. 6) for receiving the second hinge member 168 and securing the second hinge member 168 therein. The second hinge member 168 may be rotatably held in the apertures 158 or immovably held in the apertures 158. One or more additional protrusions 154 or 156 may be attached to the trailer 108 for securing the second hinge member 168 to the trailer 108, such as, the additional protrusion 184 shown in FIG. 13. Any number of protrusions 154, 156 or additional protrusions 184 may be used to secure the second hinge member 168 to the trailer 108. In some embodiments, the second hinge member 168 may be integral with and form part of the trailer 108. In some embodiments, the protrusions 154, 156 and/or 184 form part of and are integral with the trailer 108.

Referring again to FIG. 6, one or more connectors 130 movably link the first hinge member 166 to the second hinge member 168 to provide a pivotable interface between the trailer ramp 102 and the trailer 108. The connectors 130 maintain a distance between the first hinge member 166 and the second hinge member 168 as the trailer ramp 102 moves between the open position 104 and the closed position 106. The connectors 130 and the first and second hinge members 166 and 168 may interact to allow the trailer ramp 102 to have a greater range of rotation with respect to the trailer 108 than would be possible with a single hinge connection. For example, in some embodiments, the trailer ramp 102 may rotate more than about 180 degrees between the open position 104 and the closed position 106. In other embodiments, the trailer ramp 102 may rotate less than about 180 degrees between the open position 104 and the closed position 106. The connectors 130 may also include a contact arm 152 and first biasing mechanism 132, which will be discussed in more detail below.

The cams 142 are connected to the first hinge member 166, the ramp 102 and the linking arm 138. The cams 142 are spaced from each other by a spacer 146 and the first and second cams 142 and 144 are connected to the first trailer ramp 102 at a notch 350 (see also notch 350 in FIG. 8) in the cams 142. In addition to the connection between the notch 350 and the trailer ramp 102, the cams 142 may also be connected to the trailer ramp 102 by a welded connection, mechanical connection or any other suitable connection so that rotational motion of the cams 142 is transferred to the trailer ramp 102. In some embodiments, for example, the cams 142 do not include a notch 350 and the cams 142 are welded to the trailer ramp 102. In some embodiments, the cams 142 do not include a notch 350 and the cams 142 include a flat surface (not shown) in the location where the notch 350 is shown. In some embodiments, the flat surface is welded to or otherwise connected to the trailer ramp 102. In other embodiments, the cams 142 are integral with and form part of the trailer ramp 102.

The cams 142 may be rotatably connected to the first hinge member 166 by way of the sleeve 160. The cams 142 may encircle the sleeve 160 and, in some embodiments, the cams 142 are fixed to the sleeve 160 or are a unitary piece with the sleeve 160. The cams 142 are connected to the first hinge member 166 between the first and second linking supports 148 and 150. In practice, the cams 142 regulate the position of the linking arm 138 with respect to the first hinge member 166 as the trailer ramp 102 moves between the open position 104 and the closed position 106, and also provide a linkage between the linking arm 138 and the trailer ramp 102. While the cams 142 are separate pieces in the embodiment shown in FIG. 6, the cams 142 may be one unitary piece in other embodiments. In addition, the cams 142 may be any suitable shape that links the linking arm 138, the first hinge member 166 and the ramp 102 and regulates a distance between the linking arm 138 and the first hinge member 166 as the trailer ramp 102 is moved between the open 104 and the closed 106 positions.

The linking arm 138 links the cams 142 to an end of an actuator 126. The linking arm 138 includes a pivotal interface 170 to rotatably connect the linking arm 138 to the cams 142 and a pivotal interface 172 to rotatably connect the linking arm 138 to the actuator 126. The linking arm 138 may include multiple pieces, as shown in FIG. 6, or may be one unitary piece. The linking arm 138 transfers the linear motion of the actuator 126 to rotational motion of the cams 142 and trailer ramp 102.

Figure 7:
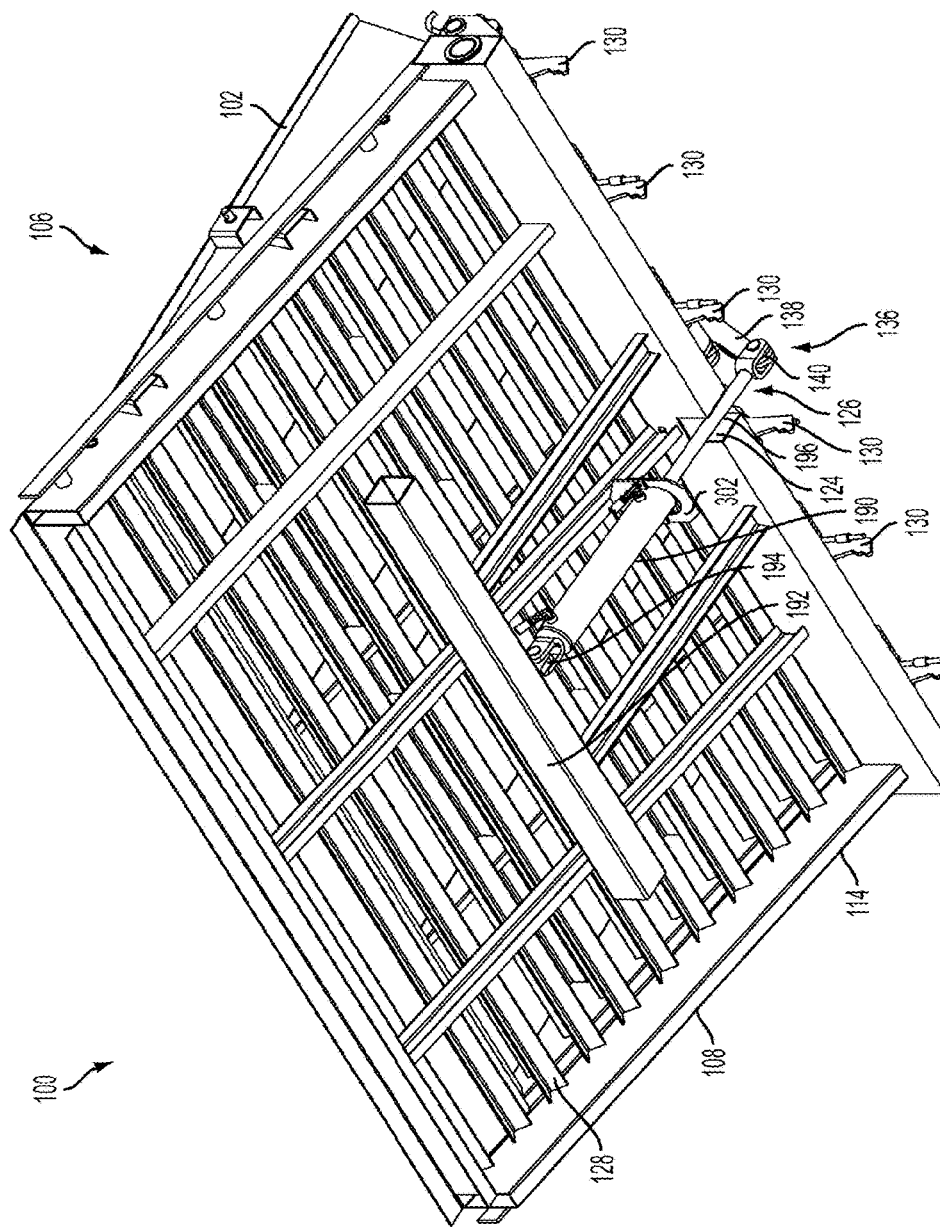
FIG. 7 is a perspective bottom view of a trailer, a trailer ramp in the closed position and an apparatus for pivoting the trailer ramp.

The actuator 126 is pivotally linked to the linking arm 138 at pivotal connection 172 and is pivotally linked to the trailer 108 at a pivotal connection 194 (FIG. 7). The actuator 126 may be any suitable actuating device, such as, for example, a hydraulic piston, an electronic actuator, a step motor, an electronic winch, a hydraulic winch, a manual winch, an air bag, a pneumatic actuator, an air cylinder, a linear actuator, a mechanical jack, a hydraulic jack, a hydraulic pump, or any other type of mechanism that imparts linear motion. In some embodiments, the actuator 126 may be powered by the motion of a towing vehicle that is linked to the actuator 126. Other mechanisms such as a trailer jack, ratchet jack, scissor jack, floor jack, screw jack, pneumatic jack, farm jack or a bottle jack may also be included in the actuator 126. The actuator 126 may be manually operated or automatically operated. For example, in some embodiments, the actuator 126 is a manually operated bottle jack or hydraulic pump. In some embodiments, the actuator 126 is engaged when the vehicle connected to the trailer 108 is moved and/or when a portion of the trailer 108 contacts another surface, such as, for example a protrusion from the ground under the trailer 108. For example, in some embodiments, contact between a part of the trailer 108 and a protrusion from the ground as the vehicle moves in reverse causes the actuator 126 to engage.

FIG. 7 is a perspective bottom view of the trailer 108, the trailer ramp 102 in the closed position 106 and the apparatus 136 for pivoting the trailer ramp 102. The actuator 126 includes a rod 196 and an actuating mechanism 190, such as, for example, a pneumatic actuator, to move the rod 196. The actuating mechanism 190 is pivotally coupled to the bottom surface 128 of the trailer 108 at a trailer member 192. The connection between the actuating mechanism 190 and the trailer member 192 may be a forked linkage 194, or any other type of rotatable connection. The actuator 126 may be linked to the trailer 108 at the dovetail portion 114 of the trailer 108 or any other portion of the trailer 108. The connection between the actuator 126 and the bottom surface 128 of the trailer 108 may be a rotatable connection to allow the actuator 126 to pivot in a plane that is perpendicular to the plane of the top surface 110 of the trailer 108. In other embodiments, the connection between the actuator 126 and the bottom surface 128 of the trailer 108 is non-rotatable.

Figure 8:
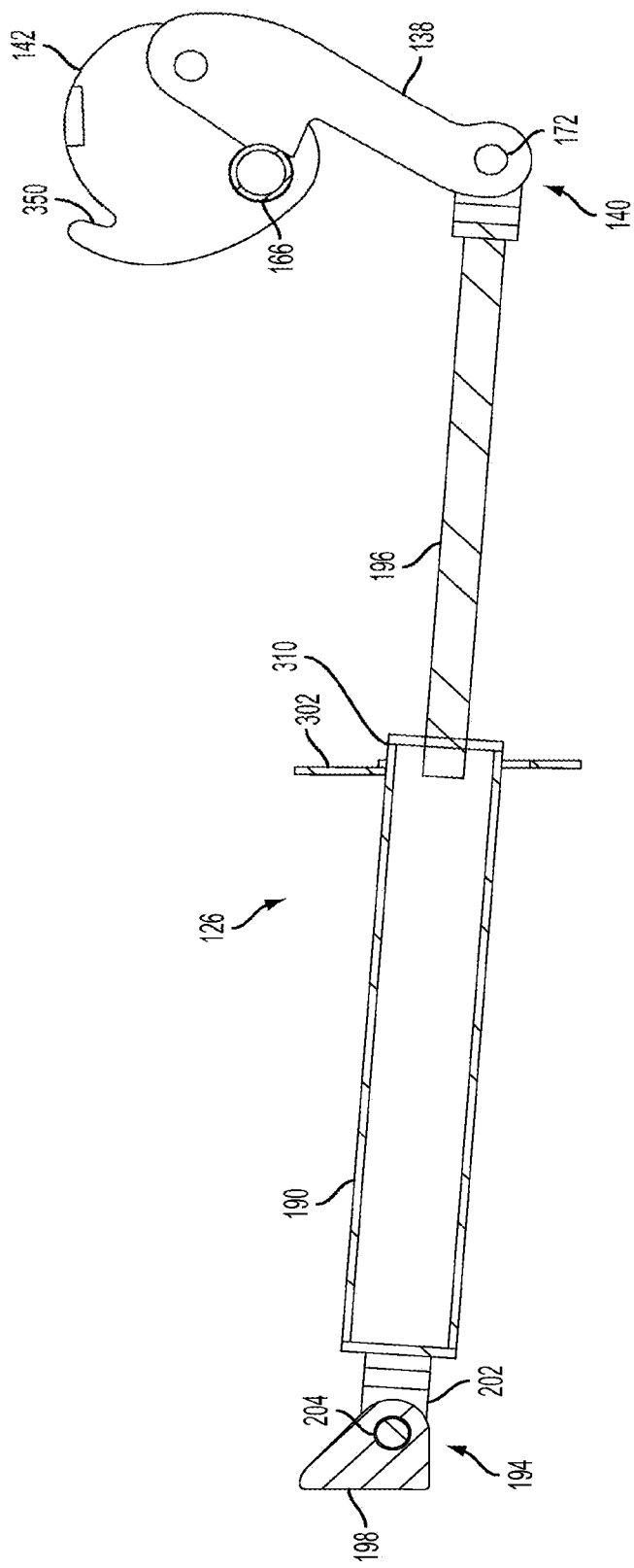
FIG. 8 is a side view of an actuator, a linking arm, a cam and a support bracket in accordance with this disclosure.

FIG. 8 is a side view of the actuator 126, the linking arm 138, the cam 142 and a support bracket 302. As stated above, the actuator 126 may include a rod 196 that is movable within the actuating mechanism 190. The rod 196 may be pivotally coupled to the linking arm 138 at the connection 172. The actuating mechanism 190 may be pivotally connected to the trailer 108 (not shown) at the forked linkage 194. The forked linkage 194 may include a trailer linkage 198 that is secured to the bottom surface 128 of the trailer 108 and an actuator linkage 202 that is securable to the actuating mechanism 190. The trailer linkage 198 may be rotatably secured to the actuator linkage 202 by a pin 204. As stated above, the forked linkage 194 may allow the actuator 126 to pivot with respect to the bottom surface 128 of the trailer 108. In some embodiments, this rotatable connection between the actuator 126 and the bottom surface 128 of the trailer 108 may allow the trailer ramp 102 to rotate more than about 180 degrees between the open position 104 and the closed position 106. In other embodiments, the actuator 126 is not pivotable with respect to the bottom surface 128 of the trailer 108 and the actuator 126 may be immovably secured to the bottom surface 128 of the trailer, for example, by a welded connection.

The actuator 126 is located within a support bracket 302. As will be described in more detail below, the actuator 126 may be movable within the support bracket 320 as the actuator 126 moves the ramp 102 between the open position 104 and the closed position 106. In other embodiments, the support bracket 320 is coupled to the actuator 126 so that the actuator 126 is not movable with respect to the support bracket 320.

Figure 9:
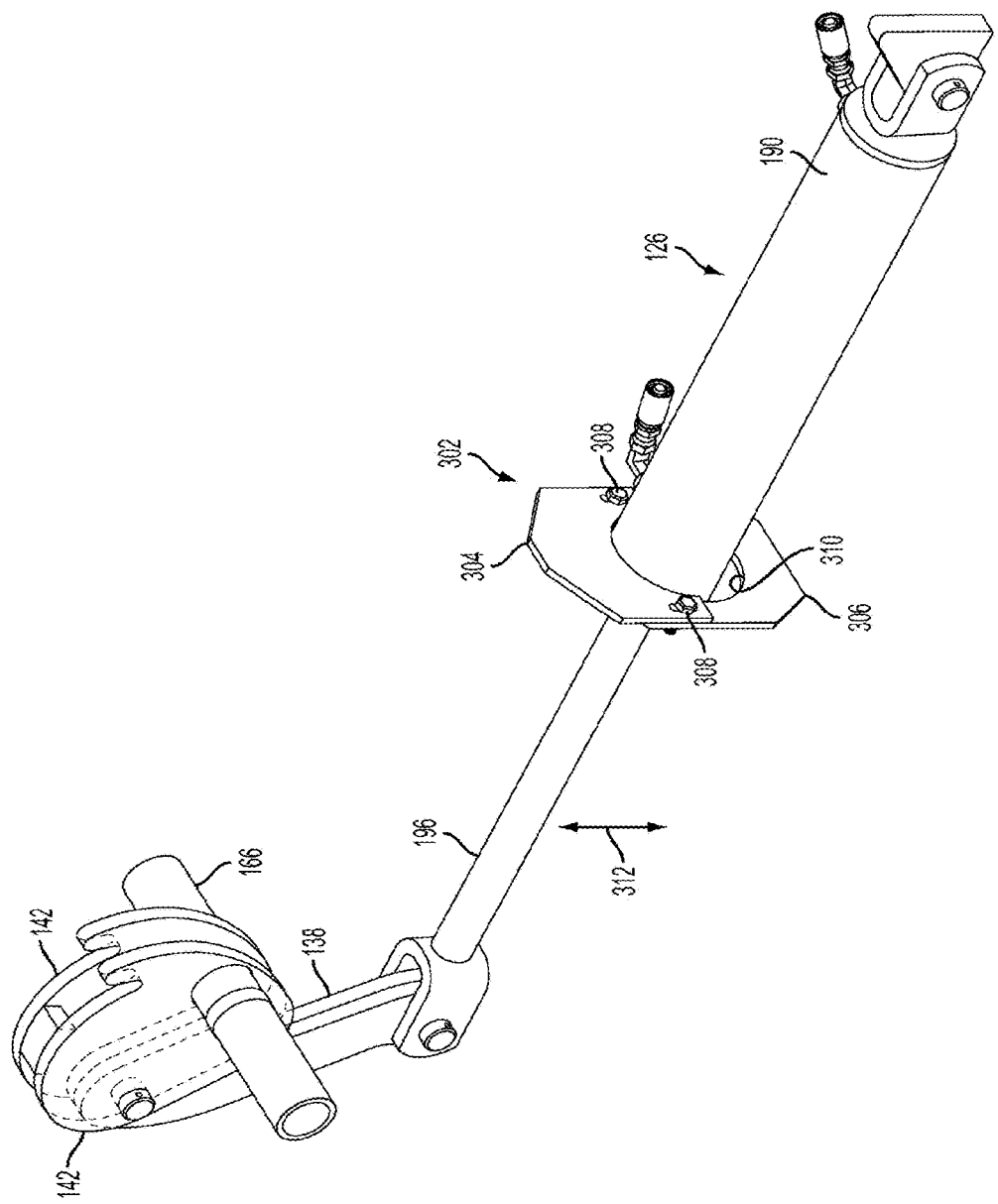
FIG. 9 is a perspective view of an actuator, a linking arm, a cam and a support bracket in accordance with this disclosure.

FIG. 9 is a perspective view of the actuator 126 coupled to the linking arm 138 and the cams 142, and the support bracket 302 surrounding the actuator 126. The support bracket 302 may include a first body section 304 and a second body section 306 that are coupled together by one or more coupling mechanisms 308. The support bracket 302 includes an opening 310 between the first and second body sections 304 and 306 to hold a portion of the actuator 126. The opening 310 may be oblong in shape such that the actuator 126 can move in a plane that is perpendicular to the plane of the trailer 108, for example, in the direction shown by arrow 312. The interior surface of the opening 310 constrains the movement of the actuator 126 to prevent the actuator 126 from moving more than a specified distance in the direction 312 or other directions. In some embodiments, the opening 310 is slightly larger than an outer diameter of the actuator 126 to constrain most movement of the actuator 126. In other embodiments, the vertical dimension of the opening 310 may be 0.5 inches larger than the diameter of the actuator 126 to allow the actuator 126 to move up to 0.25 inches in an upward direction along arrow 312 and 0.25 inches in a downward direction along arrow 312. The support bracket 302 may be located near a midpoint of the actuator 126. Referring again to FIG. 8, for example, the support bracket 302 may be located near the intersection of the actuating mechanism 190 and the rod 196 and may surround the actuating mechanism 190. In some embodiments, the support bracket 302 prevents the actuator 126 from bending at or near the intersection of the actuating mechanism 190 and the rod 196 when the actuator 126 is engaged.

Figure 10:
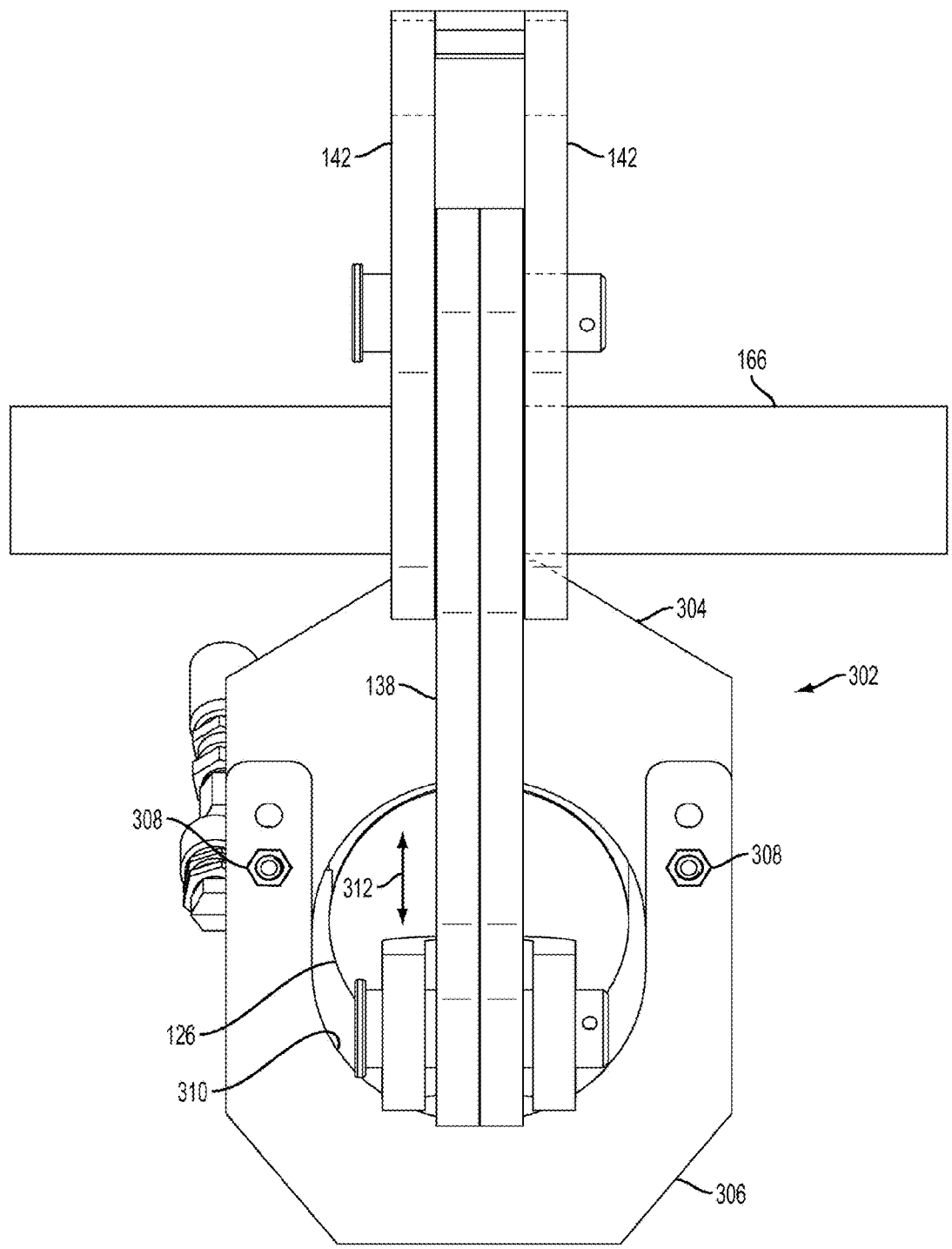
FIG. 10 is an end view of an actuator, a linking arm, a cam and a support bracket in accordance with this disclosure.

FIG. 10 is an end view of the actuator 126 coupled to the linking arm 138 and the cams 142. The support bracket 302 is also shown surrounding the actuator 126. The opening 310 of the support bracket 302 has an oblong shape so that the actuator 126 can move in the direction of arrow 312 and so that the movement of the actuator 126 is constrained by the inner surface of the opening 310. In some embodiments, the actuator 126 can move up to about 0.5 inches within the opening 310. The opening 310 may be any shape, such as, for example, a rectangle or square, and may allow the actuator 126 to move more or less than about 0.5 inches within the opening 310.

The first body section 304 and the second body section 306 of the support bracket 302 may be removably coupled together by the coupling mechanisms 308. In some embodiments, the second body section 306 may be removed from the first body section 304 so that the actuator 126 can be removed from the support bracket 302, for example, to repair or replace the actuator 126. In other embodiments, the support bracket 302 is one unitary piece and the actuator 126 may be removed from the support bracket 302 by sliding the actuator 126 out of the opening 310 in a lateral direction. Referring again to FIG. 7, the support bracket 302 may be coupled to the bottom surface 128 of the trailer 108, for example, by a welded connection. The support bracket 30 may be made of any suitable material, such as, for example, a metal material.

Figure 11:
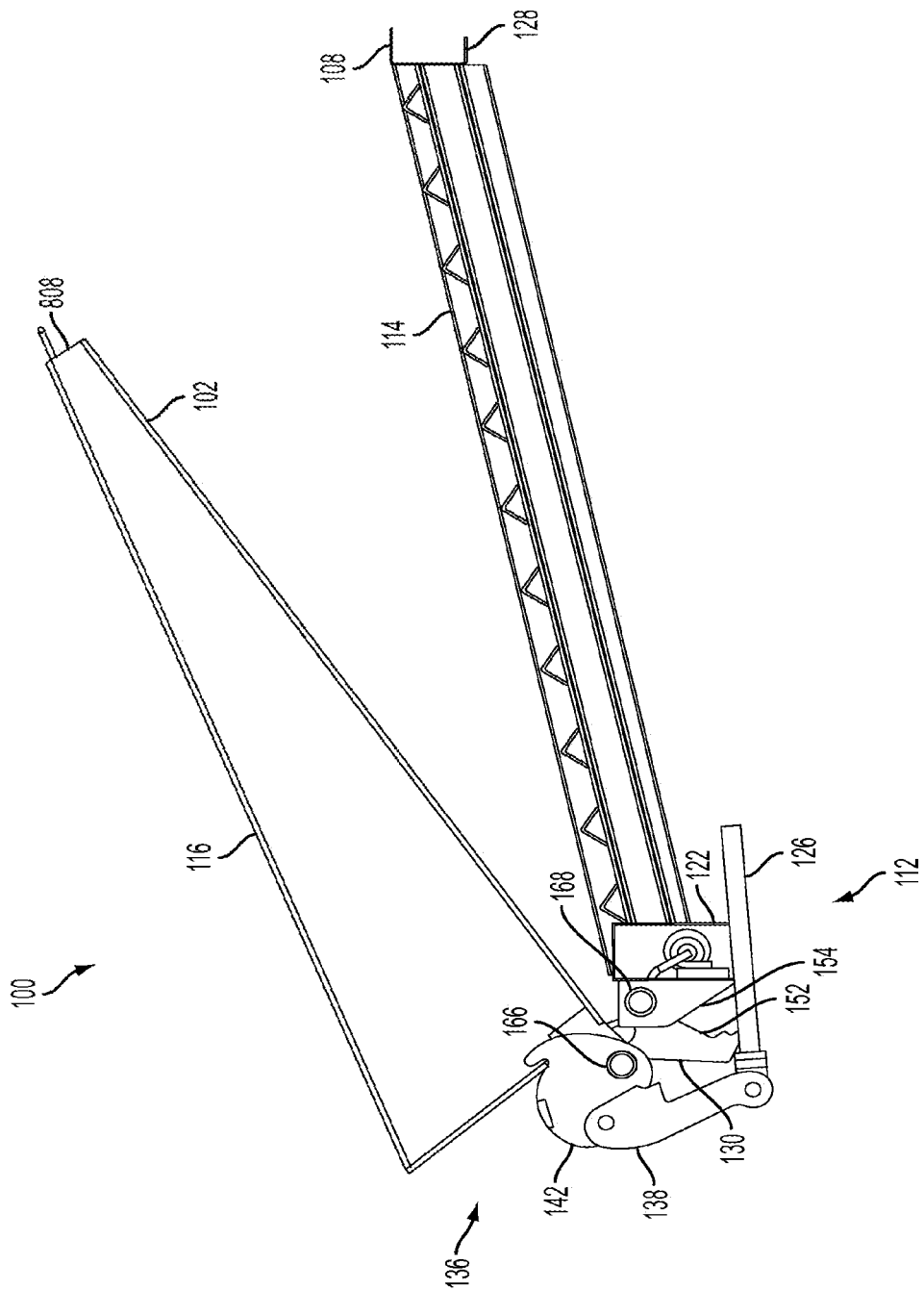
FIG. 11 is a side view of a trailer, a trailer ramp, and an apparatus for pivoting the trailer ramp.

FIG. 11 is a side view of a trailer 108, a trailer ramp 102, and an apparatus 136 for pivoting the trailer ramp 102. The apparatus 136 is shown attached to a wedge-shaped trailer ramp 102 and a dovetail portion 114 of a trailer 108. The wedge-shaped trailer ramp 102 is pivotally connected to the dovetail portion 114 of the trailer 108 by way of the apparatus 136 and is positioned between the open position 104 and the closed position 106. In some embodiments, the trailer ramp 102 can be fixed in place between the fully open position 104 and fully closed position 106. For example, in the embodiment shown in FIG. 3A, the trailer ramp 102 is fixed in place between the fully open position 104 and the fully closed position 106 by one or more linking elements 118 that secure the ramp 102 to the trailer 108. In some embodiments, the linking elements 118 may include a pivotal interface between the linking element 118 and the trailer 108 and/or trailer ramp 102 to allow the linking element 118 to rotate with respect to the trailer 108 and/or trailer ramp 102. As shown in FIG. 3A, in some embodiments the linking element 118 may also be used to secure the ramp 102 in the closed position 106.

Referring again to FIG. 11, the connector 130 of the apparatus 136 is shown in an intermediate position. The connector 130 includes a contact arm 152 for contacting the bumper 122 and a first biasing mechanism 132 (FIG. 12) for biasing the trailer ramp 102 toward the closed position 106 when the contact arm 152 contacts the bumper 122 and the biasing mechanism 132 is engaged. In use, when the trailer ramp 102 is in the closed position 106, the contact arm 152 may be situated away from the bumper 122. However, when the ramp 102 is moved toward the open position 104, the contact arm 152 moves toward the bumper 122 and eventually contacts the bumper 122 as the ramp 102 approaches the open position 104. The first biasing mechanism 132 (FIG. 12) is positioned between the connector 130 and the ramp 102 to apply a biasing force on the ramp 102 to bias the ramp 102 towards the closed position 106 and to dampen the movement of the ramp 102 toward the open position 104. An example embodiment of a position of the trailer ramp 102 at which the first biasing mechanism 132 may begin to apply a biasing force on the ramp 102 toward the closed position 106 is shown in FIG. 5. As shown in FIG. 5, the connectors 130 contact the bumper 122 and the first biasing mechanisms 132 contacts the trailer ramp 102 at member 402 to apply a biasing force to the trailer ramp 102. The connectors 130 need not contact the bumper 122 of the trailer 108 and may contact any other suitable portion of the trailer 108, for example, a frame member of the trailer 108. Similarly, the biasing mechanisms 132 may contact any portion of the trailer ramp 102 and need not contact the member 402.

Figure 12:
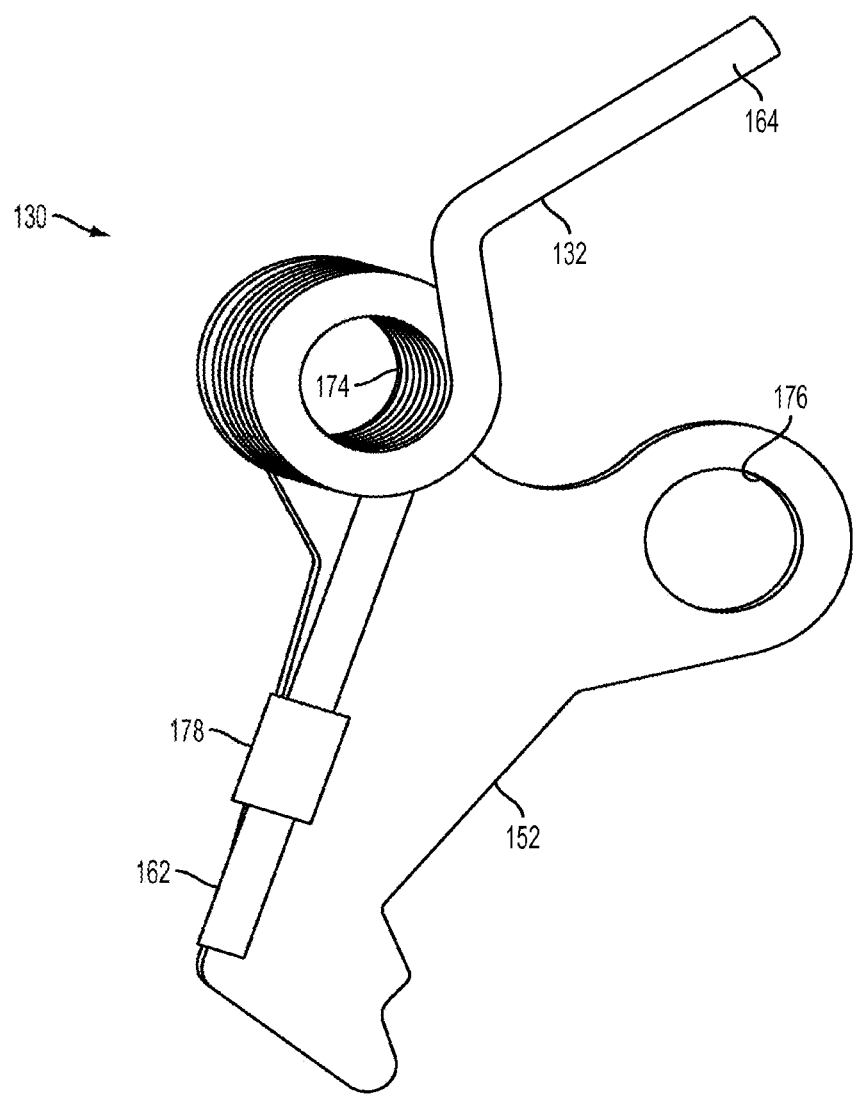
FIG. 12 is a perspective view of a connector and a biasing mechanism in accordance with this disclosure.

FIG. 12 is a perspective view of the connector 152 and the first biasing mechanism 132. As described above, the connector 130 includes a first opening 174 for receiving the first hinge member 166 and a second opening 176 for receiving the second hinge member 168. The first biasing mechanism 132 is secured to the connector 130 by a sleeve 178 which is attached to the arm 152 of the connector 130. Any other suitable mechanism may be used to secure the first biasing mechanism 132 to the connector 130. In addition, any suitable biasing tool may be substituted for the first biasing mechanism 132. The end 164 of the biasing mechanism 132 contacts the trailer ramp 102 at member 402 when the ramp 102 moves toward the open position 104. In other embodiments, the end 164 of the biasing mechanism 132 may contact any other portion of the trailer ramp 102. In some embodiments, for example, the trailer ramp 102 does not include the member 402 and the end 164 of the biasing mechanism 132 contacts another portion of the trailer ramp 102.

FIG. 13 is a perspective view of a trailer 108, a trailer ramp 102 in a location between the open 104 and the closed 106 positions and an apparatus 136 for pivoting the trailer ramp 102. The apparatus 136 may include one or more second biasing mechanisms 134 secured to the second hinge member 168. A first end 180 of the second biasing mechanism 134 may contact the trailer ramp 102 at a trailer ramp notch 186 in the additional support 188 as the ramp 102 moves toward the closed position 106 to apply a biasing force to the trailer ramp 102. As shown in FIG. 13, the second biasing mechanism 134 is disengaged from the trailer ramp 102 and does not apply a force to the trailer ramp 102 until the trailer ramp 102 has passed a certain position as the ramp 102 approaches the closed position 106, such as, for example, the upright position. The second biasing mechanism 134 may be any suitable type of biasing tool, such as, for example, a torsion spring.

Figure 14:
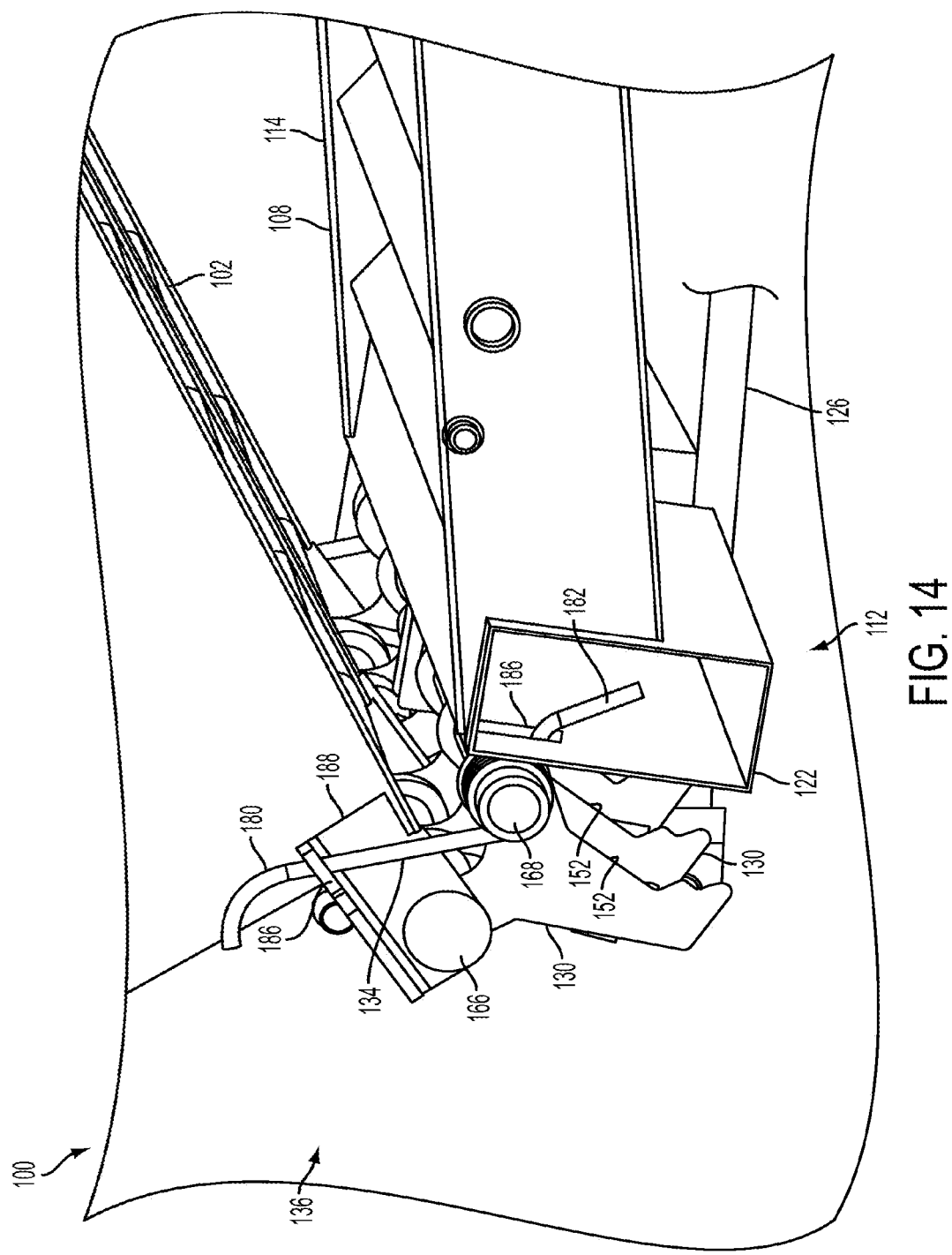
FIG. 14 is a partially cut-away, perspective view of a trailer, a trailer ramp in a position between the open and closed positions and an apparatus for pivoting the trailer ramp.

FIG. 14 is a partially cut-away, perspective side view of a trailer 108, a trailer ramp 102 in a position between the open 104 and closed 106 positions and an apparatus 136 for pivoting the trailer ramp 102. A second end 182 of the second biasing mechanism 134 may contact a notch 186 in the bumper 122. In other embodiments, the second end 182 of the second biasing mechanism 134 may contact any suitable portion of the trailer 108, for example, a portion of the frame of the trailer 108. In use, the first biasing mechanisms 132 apply a bias force on the trailer ramp 102 toward the closed position 106 at certain radial locations as the ramp 102 moves between the open 104 and closed 106 positions, and the second biasing mechanisms 134 apply a bias force on the trailer ramp 102 toward the open position 104 at certain radial locations as the ramp 102 moves between the open 104 and closed 106 positions. As described above, the first biasing mechanism 132 may be disengaged when the trailer ramp 102 is located between a vertical position and the closed position 106 (when the contact arm 152 is not forced against the bumper 122, as shown in FIG. 14) and the second biasing mechanism 134 may be disengaged when the ramp 102 is located between the vertical position and the open position 104 (when the first end 108 of the second biasing mechanism 134 is not forced against the notch 186 of the additional support 188). In some embodiments, the apparatus 136 does not include a first biasing mechanism 132 and/or a second biasing mechanism 134. For example, in some embodiments the motion of the actuator 126 is sufficiently smooth and the actuator 126 has sufficient power to smoothly move the trailer ramp 102 between the open position 104 and the closed position 106 without the need for a second biasing mechanism 134. Similarly, in some embodiments the trailer ramp 102 does not include a trailer ramp notch 186.

The trailer ramp 102 may be controlled by a user at a user interface that may be located on the system 100 or remotely from the system 100. For example, the user interface may be a mobile, wireless interface or the user interface may be coupled to the system 100 by a flexible cable to allow the user to move around the system 100 while controlling the user interface. As such, in some embodiments, the user can move outside of the vehicle and stand in a position near the trailer ramp 102 to view an area surrounding the trailer ramp 102 to insure that a path to be traveled by the trailer ramp 102 is unobstructed. In other embodiments, the user interface may be located in the cab of a truck that is coupled to the trailer 108. The user interface may provide the user with the ability to control the automated raising and lowering of the ramp 102. The system 100 may be coupled to a power supply and/or a pressurized fluid supply to power the actuator 126. For example, in some embodiments, the system includes a battery that powers a fluid pump to supply pressurized fluid to the actuator 126.

Figure 15A:
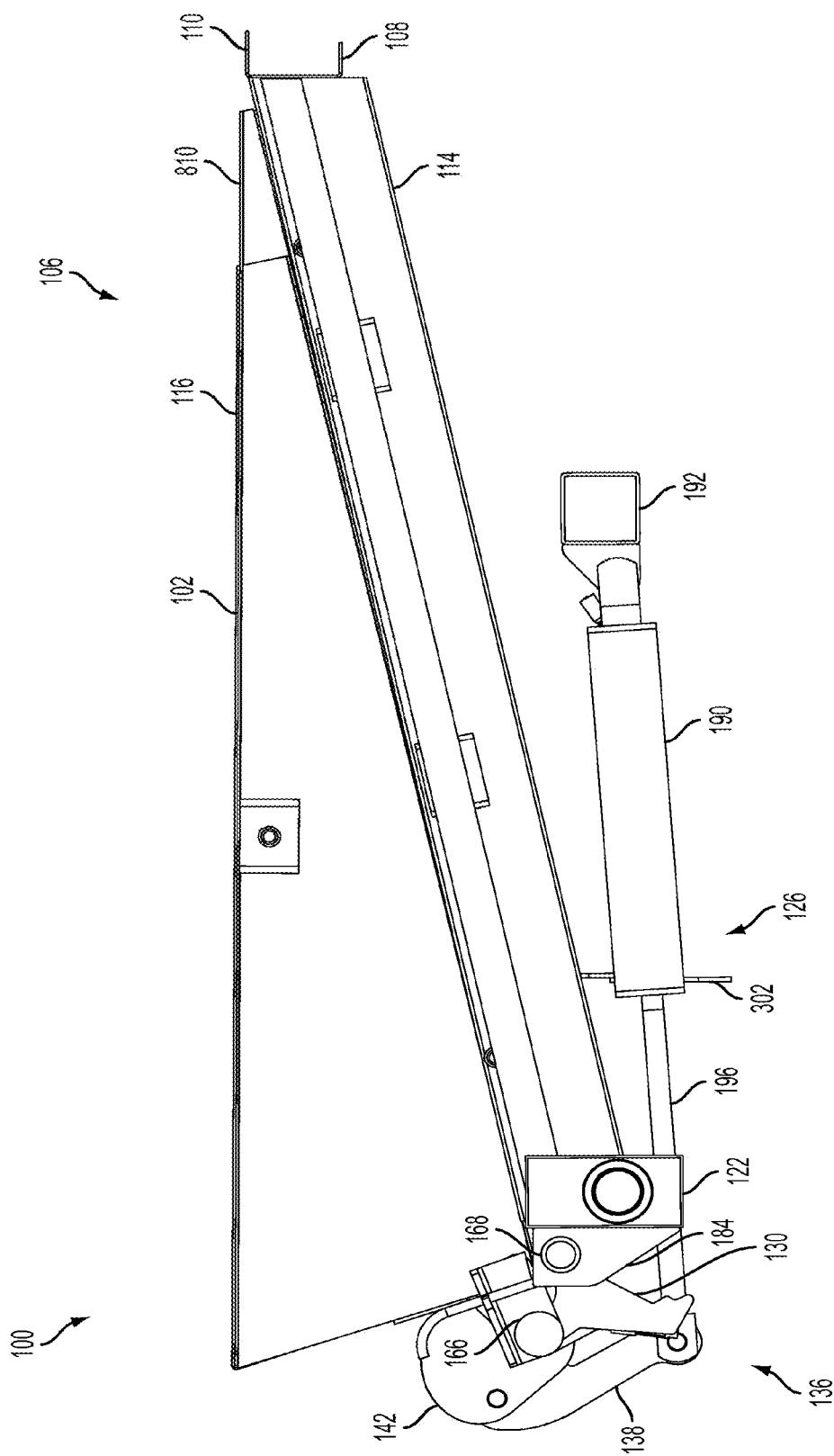
FIG. 15A is a side view of a trailer, a trailer ramp in a closed position and an apparatus for pivoting the trailer ramp.

Reference is now made to FIGS. 15A-15G. FIG. 15A is a side view of a system 100 that includes a trailer 108, a trailer ramp 102 in the closed position and an apparatus 136 for pivoting the trailer ramp 102. The system 100 may begin in the closed position 106. When the user actuates the system 100, the rod 196 of the actuator 126 moves linearly towards the actuating mechanism 190 to move the linking arm 138. The linking arm 138 transfers the substantially liner motion of the actuator 126 to rotational motion of the cams 142 and the connectors 130. The actuator 126 may pivot slightly about a pivotal interface between the actuator 126 and the trailer member 192.

The cams 142 are coupled to the ramp 102 such that rotational motion of the cams 142 causes pivoting of the trailer ramp 102. The connectors 130 maintain a distance between the first and second hinge members 166 and 168 as the ramp 102 rotates so that the trailer ramp 102 can rotate about 180 degrees or more between the open position 104 and the closed position 106. As the trailer ramp 102 is moved from the closed position 106, the first biasing mechanisms 132 apply a biasing force to the ramp 102 to help lift the ramp 102 and to dampen any vibration of the ramp 102.

FIG. 15B is a side view of the trailer 108, the trailer ramp 102, and the apparatus 136 for pivoting the trailer ramp 102. The ramp 102 has moved from the closed position 106 toward the open position 104. The cams 142 and the linking arm 138 are shown in greater detail in FIG. 15C. The cams 142 may be coupled to the ramp 102 to move the ramp 102 at a notch 186. In other embodiments, the cams 142 may be welded or otherwise connected to the ramp 102 to move the ramp 102. The rod 196 continues to move in a direction 206 and the actuator 126 may pivot slightly in a direction 208 to move the ramp 102 toward the open position 104. The support bracket 302 may limit the movement of the actuator 126 and provide a stabilizing support for the actuator 126.

FIG. 15D is a side view of the trailer 108, the trailer ramp 102 in a partially open position, and the apparatus 136 for pivoting the trailer ramp 102. The ramp 102 has moved further towards the open position 104. Once again, the cams 142 and the linking arm 138 are shown in greater detail in FIG. 15E. The rod 196 has moved further in the direction 206 to move the linking arm 138 toward the trailer 110. The first hinge member 166 and the second hinge member 168 are maintained at a specified distance from each other by the connectors 130.

FIG. 15F is a side view of the trailer 108, the trailer ramp 102 and the apparatus 136 for pivoting the trailer ramp 102. The trailer ramp 102 is now in the open position 104. The cams 142 and the linking arm 138 are shown in greater detail in FIG. 15G. The trailer ramp 102 has rotated about 180 degrees between the closed position 106 shown in FIG. 15A and the open position 104 shown in FIG. 15F. In some embodiments, the trailer ramp 102 may rotate more or less than 180 degrees between the open 104 and the closed 106 positions. For example, in some embodiments, the trailer ramp 102 may rotate more than 180 degrees so that the trailer ramp 102 can be used on uneven or slopped terrain.

Figure 16:
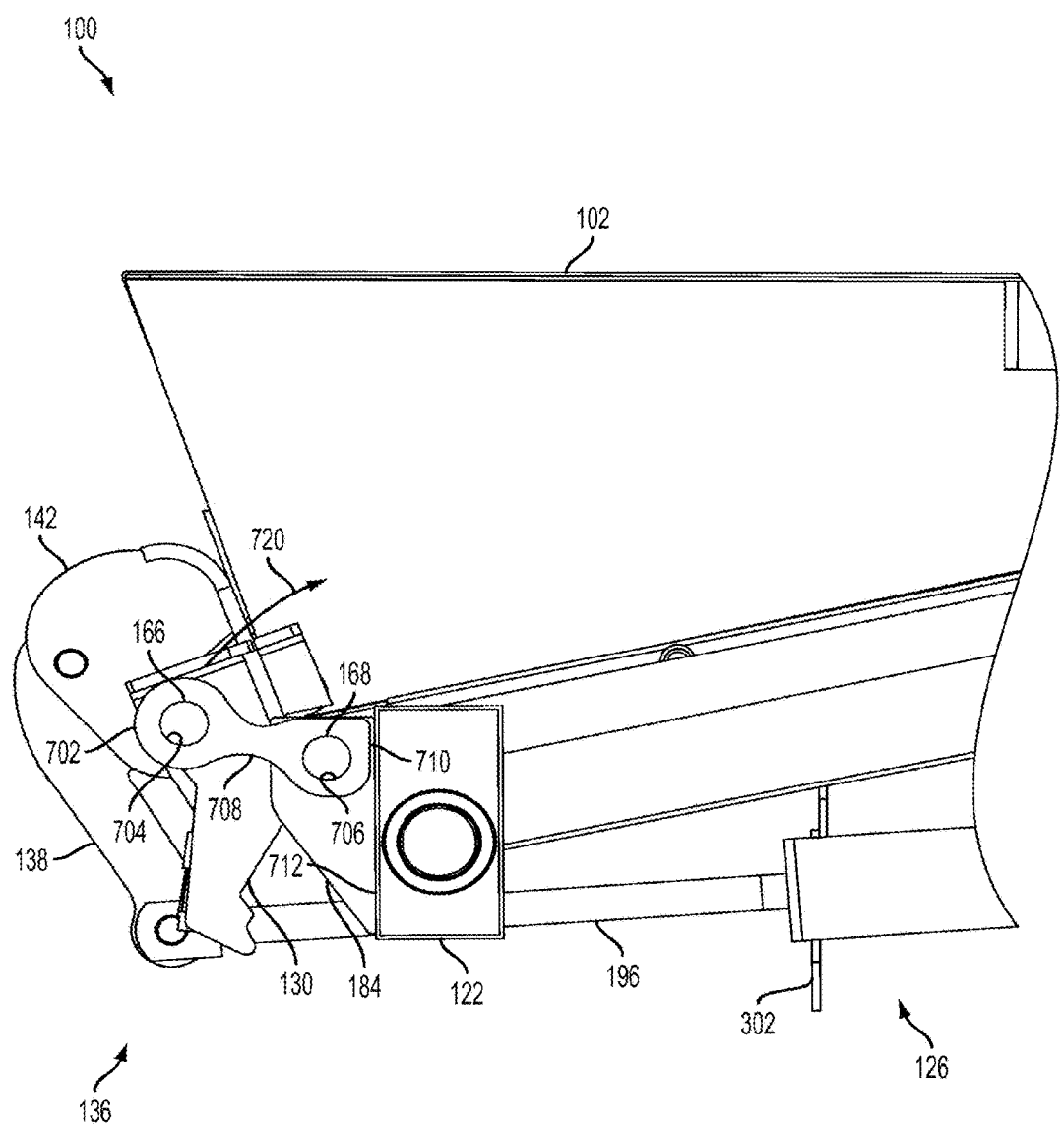
FIG. 16 is a side view of a trailer ramp and an apparatus for pivoting the trailer ramp that includes a stabilizing arm.

FIG. 16 is a side view of a trailer ramp 102 and an apparatus 136 for pivoting the trailer ramp 102 that includes a stabilizing arm 702. The stabilizing arm 702 is coupled to the first hinge member 166 and the second hinge member 168 at a first opening 704 and a second opening 706 of the stabilizing arm 702, respectively. A body section 708 of the stabilizing arm 702 connects the first hinge member 166 to the second hinge member 168. The stabilizing arm 702 includes a contact surface 710 that is configured to contact a side surface 712 of the bumper 122. In other embodiments, the contact surface 710 may contact any other surface that is fixed with respect to the trailer 108. Any number of stabilizing arms 702 may be coupled to the first hinge member 166 and the second hinge member 168. In use, the contact surface 710 contacts the side surface 712 of the bumper 122 as the trailer ramp 102 is moved from the closed position 106 towards the open position 104 to prevent the first hinge member 166 from rotating past a predetermined position in a direction shown by the arrow labeled 720 in FIG. 16. In some embodiments, for example, snow, ice or other materials may be positioned on top of the trailer ramp 102 when the trailer ramp 102 is in the closed position 106 causing the first hinge member 166 to rotate in a direction 720 when the trailer ramp 102 begins to move from the closed position 106 towards the open position 104. Movement of the first hinge member 166 in the direction 720 may be minimized by the stabilizing arm 702, thereby reducing stress on the actuator 126 and other parts of the apparatus 136.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, any use of the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have been described in connection with what are presently considered to be the most practical and preferred embodiments, it is to be understood that the invention(s) are not to be limited to the disclosed embodiments, but on the contrary, are intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

The invention claimed is:

1. A trailer ramp system for a trailer, the trailer ramp system comprising:
    a trailer ramp coupled to the trailer; and
    an actuator pivotally coupled to the trailer on a first end of the actuator and pivotally coupled to a linking arm on a second end of the actuator;
    a cam connected eccentrically to a first bar of a first hinge member so that the first bar is a first rotational axis about which the cam is rotatable;
    the cam also pivotally coupled to the linking arm and also coupled to the trailer ramp,
    wherein the cam regulates a position of the linking arm with respect to the first hinge member as the trailer ramp moves between an open position and a closed position, and
    wherein the actuator is movable to move the trailer ramp between the open position and the closed position; and
    a contact arm configured to contact the trailer and the trailer ramp during a first incomplete portion of a travel of the trailer ramp between the open position and the closed position and configured to not contact the trailer during a second incomplete portion of the travel of the trailer ramp between the open position and the closed position;
    wherein a first portion of a weight of the trailer ramp is supported by the contact arm during at least a portion of the first incomplete portion of the travel,
    wherein a second portion of the weight of the trailer ramp is supported by the cam, and
    wherein the second portion of the weight changes in magnitude at least partially during the first incomplete portion of travel in response to the contact arm contacting the trailer and the trailer ramp.

2. The system according to claim 1, wherein a connection between the trailer ramp and the trailer comprises a connector that links the first hinge member to a second hinge member,
    wherein the first hinge member comprises the first bar coupled to the trailer ramp by a first linking support having a sleeve that at least partially encircles the first bar of the first hinge member,
    wherein the second hinge member comprises a second bar coupled to the trailer by a first protrusion including an aperture for receiving the second bar of the second hinge member,
    wherein the first hinge member is maintained at a distance from the second hinge member by the connector as the trailer ramp moves from the open position to the closed position.

3. The system according to claim 2,
    wherein the connector comprises the contact arm for contacting the trailer,
    wherein the contact arm comprises an aperture through which the first bar extends and
    wherein the first bar is an axis of rotation of the contact arm,
    wherein the contact arm is movable by the trailer ramp and the first bar to contact the fixed surface on the trailer in response to a movement of the contact arm, and
    wherein the connector further comprises a first biasing mechanism for applying a biasing force to the trailer ramp when the contact arm contacts the trailer.

4. The system according to claim 3, wherein the first biasing mechanism applies a biasing force in a direction opposite a movement of the trailer ramp when the trailer ramp is moving toward the open position.

5. The system according to claim 4, further comprising a second biasing mechanism for biasing the trailer ramp in a direction toward the open position when the trailer ramp is moving toward the closed position.

6. The system according to claim 2,
    wherein the linking arm is pivotally restable against the second bar in response to a motion of the actuator, and
    wherein the linking arm is configured to transfer the motion of the actuator to a rotational motion of the cam about the first rotational axis,
    wherein the rotational motion of the cam induces a motion of the trailer ramp relative to the first bar.

7. The system according to claim 1, wherein the actuator is a linear actuator and comprises one or more of a hydraulic piston, an electrical actuator, a step motor, an electronic winch, a hydraulic winch, a manual winch, an air bag, a pneumatic actuator, an air cylinder, a linear actuator, a mechanical jack, a hydraulic jack and a hydraulic pump.

8. The system according to claim 1, wherein a top surface of the trailer ramp rotates about 180 degrees between the open position and the closed position.

9. The system according to claim 1, further comprising one or more support members configured to secure the trailer ramp in an intermediate position.

10. The system according to claim 1, wherein the actuator is movable within a slot in the trailer.

11. The system according to claim 1, wherein the actuator pivots up to about 2 degrees about a pivotal coupling between the actuator and the trailer.

12. The system according to claim 1, further comprising a coupling mechanism comprising a support bracket coupled to a bottom surface of the trailer ramp, wherein at least part of the actuator is at least partially encircled within an oblong opening positioned between a first body section and a second body section of the coupling mechanism to restrain some pivotal movement of the actuator in a plane perpendicular to a plane of the trailer.

13. The system according to claim 1, wherein the cam further comprises a notch connectable to the trailer ramp so that rotational movement of the cam is transferred to the trailer ramp.

14. A trailer ramp system for a trailer, the trailer ramp system comprising:
    a trailer ramp coupled to the trailer; and
    a cam connected eccentrically to a first bar of a first hinge member so that the first bar is a first rotational axis about which the cam is rotatable;
    the cam also pivotally coupling an actuator to the trailer ramp,
    wherein the actuator is movable to move the trailer ramp between an open position and a closed position;

a contact arm that contacts the trailer and the trailer ramp during a first incomplete portion of a travel of the trailer ramp between the open position and the closed position;

wherein a first portion of a weight of the trailer ramp is supported by the contact arm during at least a portion of the first incomplete portion of the travel, wherein a second portion of the weight of the trailer ramp is supported by the cam, and wherein the second portion of the weight changes in magnitude at least partially during the first incomplete portion of travel in response to the contact arm contacting the trailer and the trailer ramp, wherein the contact arm is configured to not contact the trailer during a second incomplete portion of the travel of the trailer ramp between the open position and the closed position.

15. A trailer ramp system for a trailer, the trailer ramp system comprising:

a trailer ramp coupled to the trailer; and an actuator pivotally coupled to the trailer adjacent a first end of the actuator and pivotally coupled to a linking arm adjacent a second end of the actuator;

a cam connected eccentrically to a first bar of a first hinge member so that the first bar is a first rotational axis about which the cam is rotatable;

the cam also pivotally coupled to the linking arm and also coupled to the trailer ramp, wherein the cam is both movable relative to the trailer ramp and also movable relative to the trailer, wherein the cam regulates a position of the linking arm with respect to the first hinge member as the trailer ramp moves between an open position and a closed position, and wherein the actuator is movable to move the trailer ramp between the open position and the closed position, wherein a connection between the trailer ramp and the trailer comprises a connector that links the first hinge member to a second hinge member, wherein the first hinge member comprises the first bar coupled to the trailer ramp by a first linking support having a sleeve that at least partially encircles the first bar of the first hinge member, wherein the second hinge member comprises a second bar coupled to the trailer by a first protrusion including an aperture for receiving the second bar of the second hinge member, and wherein the first hinge member is maintained at a distance from the second hinge member by the connector as the trailer ramp moves from the open position to the closed position.

16. The system according to claim 15, wherein the connector comprises a contact arm for contacting the trailer, wherein the contact arm comprises an aperture through which the first bar extends and wherein the first bar is an axis of rotation of the contact arm, wherein the contact arm is movable by the trailer ramp and the first bar to contact the fixed surface on the trailer in response to a movement of the contact arm, and wherein the connector further comprises a first biasing mechanism for applying a biasing force to the trailer ramp when the contact arm contacts the trailer.

17. The system according to claim 16, wherein the first biasing mechanism applies a biasing force in a direction opposite a movement of the trailer ramp when the trailer ramp is moving toward the open position.

18. The system according to claim 15, wherein the linking arm is pivotally restable against the second bar in response to a motion of the actuator, and wherein the linking arm is configured to transfer the motion of the actuator to a rotational motion of the cam about the first rotational axis, wherein the rotational motion of the cam induces a motion of the trailer ramp relative to the first bar.

19. The system according to claim 15, further comprising a coupling mechanism comprising a support bracket coupled to a bottom surface of the trailer ramp, wherein at least part of the actuator is at least partially encircled within an oblong opening positioned between a first body section and a second body section of the coupling mechanism to restrain some pivotal movement of the actuator in a plane perpendicular to a plane of the trailer.

20. The system according to claim 15, wherein the cam further comprises a notch connectable to the trailer ramp so that rotational movement of the cam is transferred to the trailer ramp.

* * * * *